(12) United States Patent
Tiemann et al.

(10) Patent No.: US 7,085,497 B2
(45) Date of Patent: Aug. 1, 2006

(54) VEHICULAR COMMUNICATION SYSTEM

(75) Inventors: Jerome Johnson Tiemann, Schenectady, NY (US); Richard Louis Frey, Delanson, NY (US); William Sven Barquist, Jr., Lakeport, CA (US); William Taylor Lotshaw, Bethesda, MD (US); Sandra Freedman Feldman, Owings Mills, MD (US); John Jesse Soderberg, Acworth, GA (US); George Allan Whittaker, Alpharetta, GA (US)

(73) Assignee: Lockheed Martin Corporation, Bethesda, MD (US)

( * ) Notice: Subject to any disclaimer, the term of this patent is extended or adjusted under 35 U.S.C. 154(b) by 771 days.

(21) Appl. No.: 10/116,618

(22) Filed: Apr. 3, 2002

(65) Prior Publication Data

US 2003/0198475 A1 Oct. 23, 2003

(51) Int. Cl.
*H04J 14/02* (2006.01)
*H04B 10/10* (2006.01)
*H04B 10/24* (2006.01)

(52) U.S. Cl. ............... 398/107; 398/113; 398/115; 398/96

(58) Field of Classification Search .......... 398/96, 398/115–116, 107, 113
See application file for complete search history.

(56) References Cited

U.S. PATENT DOCUMENTS

| | | | |
|---|---|---|---|
| 3,883,217 A | 5/1975 | Love et al. |
| 3,887,876 A | 6/1975 | Zeidler |
| 3,936,141 A | 2/1976 | Milton |
| 3,943,358 A | 3/1976 | Reymond et al. |
| 4,054,366 A | 10/1977 | Barnoski et al. |
| 4,166,946 A | 9/1979 | Chown et al. |
| 4,234,969 A | 11/1980 | Singh |
| 4,249,266 A | 2/1981 | Nakamori |
| 4,301,543 A | 11/1981 | Palmer |
| 4,307,933 A | 12/1981 | Palmer et al. |
| 4,317,614 A | 3/1982 | Palmer |

(Continued)

FOREIGN PATENT DOCUMENTS

DE   30 07 958   9/1981

(Continued)

OTHER PUBLICATIONS

Stewart D. Personick, *Optical Fiber Transmission Systems*, pp. 1-3 (1981).

(Continued)

*Primary Examiner*—Leslie Pascal
(74) *Attorney, Agent, or Firm*—Michael J. Turton; Kilpatrick Stockton LLP

(57) ABSTRACT

A communication system includes an optical "LAN" (50) interconnecting a plurality of information sources (16a) and sinks (22a) with a light-to-electrical converter (36a) associated with an electrical RF transmitters (32a) and an RF-to-light converter (38a) to a receiver (34a). The transmitter is coupled by way of electrical-to-light converter (46a), and the receiver is coupled by way of light-to-electrical converter (44a), and by way of a directional coupler (76a), to an end of an optical bus (74a), so that light signals representing signals to be transmitted flow in one direction, and light signals representing received signals flow in the other direction through the bus. A directional coupler (72a) at the other end of the optical bus routes the transmit light signals to a light-to-RF converter (47a) which feeds a sink or antenna (12a), and received signals from a source or antenna are routed by way of an RF-to-light converter (40a) and the directional coupler (72a) onto the optical bus (74a).

7 Claims, 10 Drawing Sheets

U.S. PATENT DOCUMENTS

| | | |
|---|---|---|
| 4,366,565 A | 12/1982 | Herskowitz |
| 4,367,460 A | 1/1983 | Hodara |
| 4,400,054 A | 8/1983 | Biard et al. |
| 4,423,922 A | 1/1984 | Porter |
| 4,435,849 A | 3/1984 | Ilgner et al. |
| 4,446,515 A | 5/1984 | Sauer et al. |
| 4,457,581 A | 7/1984 | Johnson et al. |
| 4,482,980 A | 11/1984 | Korowitz et al. |
| 4,506,153 A | 3/1985 | Ohno |
| 4,543,574 A | 9/1985 | Takagi et al. |
| 4,545,074 A | 10/1985 | Balliet et al. |
| 4,554,511 A | 11/1985 | Braun |
| 4,577,184 A | 3/1986 | Hodara et al. |
| 4,595,839 A | 6/1986 | Braun et al. |
| 4,630,256 A | 12/1986 | Albanese |
| 4,654,890 A | 3/1987 | Hasegawa et al. |
| 4,671,608 A | 6/1987 | Konishi |
| 4,674,830 A | 6/1987 | Shaw et al. |
| 4,705,350 A * | 11/1987 | Cheng ................. 359/238 |
| 4,715,012 A | 12/1987 | Mueller, Jr. |
| 4,717,229 A | 1/1988 | Cutler |
| 4,731,784 A | 3/1988 | Keller et al. |
| 4,739,183 A | 4/1988 | Tokura et al. |
| 4,756,595 A | 7/1988 | Braun et al. |
| 4,759,011 A | 7/1988 | Hicks, Jr. |
| 4,761,833 A | 8/1988 | Epworth |
| 4,786,130 A | 11/1988 | Georgiou et al. |
| 4,810,052 A | 3/1989 | Fling |
| 4,829,593 A | 5/1989 | Hara |
| 4,845,483 A | 7/1989 | Negishi |
| 4,850,047 A | 7/1989 | Iguchi et al. |
| 4,883,335 A | 11/1989 | Alferness et al. |
| 4,898,565 A | 2/1990 | Braun |
| 4,932,004 A | 6/1990 | Hodara et al. |
| 4,946,244 A | 8/1990 | Schembri |
| 4,947,134 A | 8/1990 | Olsson |
| 4,948,218 A | 8/1990 | Kobayashi et al. |
| 4,958,354 A | 9/1990 | Urakami et al. |
| 4,959,837 A | 9/1990 | Fevrier et al. |
| 5,046,137 A | 9/1991 | Kurobe et al. |
| 5,055,827 A | 10/1991 | Philipp |
| 5,058,101 A | 10/1991 | Albanese et al. |
| 5,058,974 A | 10/1991 | Mollenauer |
| 5,080,505 A | 1/1992 | Epworth |
| 5,083,874 A | 1/1992 | Aida et al. |
| 5,117,196 A | 5/1992 | Epworth et al. |
| 5,117,303 A | 5/1992 | Desurvire et al. |
| 5,129,019 A | 7/1992 | Robberg et al. |
| 5,133,031 A | 7/1992 | Tanaka et al. |
| 5,179,603 A | 1/1993 | Hall et al. |
| 5,181,134 A | 1/1993 | Fatehi et al. |
| 5,185,735 A | 2/1993 | Ernst |
| 5,187,605 A | 2/1993 | Shikata et al. |
| 5,189,541 A | 2/1993 | Konishi |
| 5,212,577 A | 5/1993 | Nakamura et al. |
| 5,222,166 A | 6/1993 | Weltha |
| 5,283,687 A | 2/1994 | Hsu et al. |
| 5,296,957 A | 3/1994 | Takahashi et al. |
| 5,307,197 A | 4/1994 | Tanabe et al. |
| 5,309,564 A | 5/1994 | Bradley et al. |
| 5,315,424 A | 5/1994 | Boden et al. |
| 5,317,580 A | 5/1994 | Auffret et al. |
| 5,319,642 A | 6/1994 | Ota |
| 5,345,230 A | 9/1994 | Jackson et al. |
| 5,347,384 A | 9/1994 | McReynolds et al. |
| 5,361,262 A | 11/1994 | Cheung |
| 5,363,367 A | 11/1994 | Kobayashi et al. |
| 5,369,516 A | 11/1994 | Uchida |
| 5,392,154 A | 2/1995 | Chang et al. |
| 5,412,746 A | 5/1995 | Rossberg et al. |
| 5,414,416 A | 5/1995 | Yamakita et al. |
| 5,424,864 A | 6/1995 | Emura |
| 5,432,874 A | 7/1995 | Muraguchi |
| 5,434,861 A | 7/1995 | Pritty et al. |
| 5,471,342 A | 11/1995 | Junginger et al. |
| 5,479,082 A | 12/1995 | Calvani et al. |
| 5,481,478 A | 1/1996 | Palmieri et al. |
| 5,483,233 A | 1/1996 | Pettitt et al. |
| 5,500,857 A | 3/1996 | Nakata |
| 5,502,589 A | 3/1996 | Yamamoto et al. |
| 5,506,709 A | 4/1996 | Segal et al. |
| 5,508,689 A | 4/1996 | Rado et al. |
| 5,517,622 A | 5/1996 | Ivanoff et al. |
| 5,533,153 A | 7/1996 | Ota |
| 5,539,558 A | 7/1996 | Yonemura et al. |
| 5,548,431 A | 8/1996 | Shin et al. |
| 5,552,921 A | 9/1996 | Hetzel et al. |
| 5,572,612 A | 11/1996 | Delavaux et al. |
| 5,615,290 A | 3/1997 | Harasawa et al. |
| 5,623,169 A | 4/1997 | Sugimoto et al. |
| 5,664,035 A | 9/1997 | Tsuji et al. |
| 5,684,899 A | 11/1997 | Ota |
| 5,712,932 A | 1/1998 | Alexander et al. |
| 5,712,937 A | 1/1998 | Asawa et al. |
| 5,717,795 A | 2/1998 | Sharma et al. |
| 5,732,086 A | 3/1998 | Liang et al. |
| 5,745,479 A | 4/1998 | Burns et al. |
| 5,764,821 A | 6/1998 | Glance |
| 5,777,561 A * | 7/1998 | Chieu et al. ............. 340/10.32 |
| 5,778,118 A | 7/1998 | Sridhar |
| 5,793,908 A | 8/1998 | Mizuochi et al. |
| 5,796,890 A | 8/1998 | Tsuji et al. |
| 5,801,865 A | 9/1998 | Weis et al. |
| 5,809,187 A | 9/1998 | Peck, Jr. et al. |
| 5,815,294 A | 9/1998 | Ishikawa et al. |
| 5,825,515 A | 10/1998 | Anderson |
| 5,825,949 A | 10/1998 | Choy et al. |
| 5,838,989 A | 11/1998 | Hutchison et al. |
| 5,854,698 A | 12/1998 | Eskildsen et al. |
| 5,866,898 A | 2/1999 | Hodgson et al. |
| 5,880,863 A | 3/1999 | Rideout et al. |
| 5,894,362 A | 4/1999 | Onaka et al. |
| 5,898,673 A | 4/1999 | Riggan et al. |
| 5,898,801 A | 4/1999 | Braun et al. |
| 5,901,260 A | 5/1999 | Braun et al. |
| 5,910,851 A | 6/1999 | Flaherty |
| 5,937,032 A | 8/1999 | Nummelin et al. |
| 5,943,148 A | 8/1999 | Hamel et al. |
| 5,949,560 A | 9/1999 | Roberts et al. |
| 5,995,258 A | 11/1999 | Weber et al. |
| 6,008,915 A | 12/1999 | Zyskind |
| 6,014,481 A | 1/2000 | Kremers |
| 6,075,628 A | 6/2000 | Fisher et al. |
| 6,075,648 A | 6/2000 | Yamamoto et al. |
| 6,084,233 A | 7/2000 | Hodgson et al. |
| 6,111,888 A | 8/2000 | Green et al. |
| 6,122,095 A | 9/2000 | Fatehi |
| 6,128,111 A | 10/2000 | Roberts |
| 6,140,920 A | 10/2000 | Roberts |
| 6,157,725 A | 12/2000 | Becker |
| 6,175,533 B1 | 1/2001 | Lee et al. |
| 6,345,137 B1 | 2/2002 | Imajo |
| 6,385,366 B1 | 5/2002 | Lin |
| 6,449,072 B1 | 9/2002 | Sian et al. |
| 6,499,027 B1 | 12/2002 | Weinberger |
| 6,895,185 B1 * | 5/2005 | Chung et al. ................. 398/72 |
| 6,912,339 B1 | 6/2005 | Whittaker |
| 2002/0018260 A1 | 2/2002 | Kisovec et al. |
| 2002/0044565 A1 | 4/2002 | Park |
| 2002/0101874 A1 | 8/2002 | Whittaker et al. |
| 2004/0076434 A1 | 4/2004 | Whittaker et al. |

FOREIGN PATENT DOCUMENTS

| | | |
|---|---|---|
| DE | 3807072 A1 | 8/1988 |
| DE | 3938856 A1 | 11/1989 |
| DE | 4331330 A1 | 9/1993 |
| DE | 42 26 838 A1 | 2/1994 |
| DE | 4427187 A1 | 2/1996 |
| EP | 0 069 356 A2 | 1/1983 |
| EP | 000103873 A2 | 3/1984 |
| EP | 0 105 753 A2 | 4/1984 |
| EP | 0 164 652 A2 | 12/1985 |
| EP | 0 231 635 A2 | 8/1987 |
| EP | 0 356 090 A2 | 2/1990 |
| EP | 0 380 341 A2 | 8/1990 |
| EP | 0 393 293 | 10/1990 |
| EP | 0 414 333 A2 | 2/1991 |
| EP | 0 414 333 A3 | 2/1991 |
| EP | 0 905 936 A2 | 3/1991 |
| EP | 0 451 426 | 10/1991 |
| EP | 0 503 212 | 9/1992 |
| EP | 0 739 103 A2 | 10/1996 |
| EP | 0 744 797 A1 | 11/1996 |
| EP | 0 899 161 A1 | 3/1999 |
| EP | 0 350 720 A2 | 1/2001 |
| EP | 0 350 720 A3 | 1/2001 |
| EP | 1 246 378 A2 | 10/2002 |
| FR | 86-191340/30 | 6/1986 |
| GB | 2 073 877 A | 10/1981 |
| GB | 2087679 | 5/1982 |
| GB | 2102232 | 1/1983 |
| GB | 2189961 | 11/1987 |
| GB | 2 255 683 A | 11/1992 |
| JP | 7-202921 | 8/1995 |
| JP | 9/51322 | 2/1997 |
| JP | 9-321739 | 12/1997 |
| JP | 10-107773 | 4/1998 |
| JP | 11-87823 | 3/1999 |
| JP | 11-331224 | 3/1999 |
| WO | WO 93/03406 | 2/1993 |
| WO | WO 00/57582 | 9/2000 |

OTHER PUBLICATIONS

H. Hodara, and E. Miles, *"High-Speed Local Area Networks"*, Fiber and Integrated Optics: (1992) pp. 253-277.

N.A. Olsson, *Lightwave Systems With Optical Amplifiers,* Journal of Lightwave Technology, pp. 1071-1082 (Jul., 1989).

ITU-T Recommendation G.681, Series G: Transmission Systems and Media, Digital Systems and Networks; Functional characteristics of interoffice and long-haul systems using optical amplifiers, including optical multiplexing (Oct. 1996).

ITU-T Recommendation G.692, Series G: Transmission Systems and Media, Digital Systems and Networks; Optical interfaces for multichannel systems with optical amplifiers (Oct. 1998).

Chart and figures for optical fiber cable and baseband transmission, available at http://www.microsoft.com/technet/WFW/wfw31/1_ch1.asp.

HDR 7.0 2 73; 7.0 Fiber Optic Ethernet—Types FOIRL and 10 BASE-F available at http://www.uni-trier.de/infos/ether/ethernet-guide/ethemet-guide.html.

3.0 IEEE Acronyms, available at http://spacey.net/ldavis/Design_Ethernet_Note.html, no date.

Fibre Channel—Overview of the Technology, Sep. 9, 2000, pp. 1-9 available at http://fibrechannel.org/technology.

Bi-Directional Optical Backplane Bus for Board to Board Optoelectronic Interconnects, Gicheri Kim, Jinghuai Fa and Ray T. Chen, 1-4 (Sep. 9, 2000) available at http://ece.utexas.edu/projects/ece/mrc/profs/chen_projects/optbus/optbus.html.

SOME Bus (Simultaneous Optical Multiprocessor Exchange Bus)(Sep. 9, 2000) available at http://eb.uah.edu/~cohen/some_bus/some_bus.html.

Integrated Explorations of the Spectral, Temporal and Spatial Degrees of Freedom 1 (Sep. 9, 2000) available at http://thebusinessedge.com/reruns/cito/sargent/sld001.htm.

Challenges in IP LANs on Higher-Dimensional Encoding (slide 4) (Sep. 9, 2000), p. 1 available at http://thebusinessedge.com/reruns/cito/sargent/sld004.htm.

0034-P PCI 1-Gig Fibre Channel Optical Host Bus Adapter 1-4 available at http://solutions.sun.com/dbsearch/index.cgi?STATE=product&CMD=show&p_id=58181 (Sep. 9, 2000).

Architectural and Engineering Issues for Building an Optical Internet 1-55 (Sep. 9, 2000) available at http://www.canet3.net/papers/ArchandEngIssues.html.

Baker, *Monomode Fiber-Optic Design with Local-Area and Long-Haul Network Applications*, pp. 370-371.

Karim, *Chapter 9: Electro-Optical Devices and Systems*, Fiber-Optics-Based Devices and Systems, pp. 434-435.

Chinlon Lin, *Systems Applications of WDM Technologies in Optical Communications*, SPIE-International Society for Optical Engineering (Aug. 15-18, 1994).

Manuel Lopez-Amo, Loudon T Blair & Paul Urquhart, *Wavelength-Division-Multiplexed distributed optical fiber amplifier bus network for data and sensors*, Optics Letter 1159-61(Jul. 15, 1993).

Francesco Matera & Marina Settembre, *Performance Evaluation of Optically Amplified Systems Operating in Optical Networks*, Microwave & Optical Technology Letters (Nov. 1996).

Spirit et al., *140-km 20-Gbit/s repeaterless transmission employing distributed erbium amplification*, Optical Fiber Communication Conference (1992).

Philip J. Koopman, Jr., and Bhargav P. Upender., "Time Division Multiple Access Without a Bus Master," United Technologies Research Center, UTRC Technical Report RR-9500470 (Jun. 1995).

Technical Report CSRI-298 entitled "A New Binary Logarithmic Arbitration Method for Ethernet," by Mart L. Molle of Computer Systems Research Institute, pp. 1-57 (Apr. 1994).

WRL Research Report 88/4 entitled "Measured Capacity of an Ethernet: Myths and Reality" by David R. Boggs, et al., printed by Digital Western Research Laboratory, Palo Alto, California (Sep. 1998) (pp. 1-31), originally published in *Proceedings of the SIGCOMM '88 Symposium on Communications Architectures and Protocols*, ACM SIGCOMM, Stanford, California, Aug. 1988.

Yamashita, et al., "Studies of a system gathering multichannel visual signals using a single optical fiber and a bi-directional optical amplifier," *T.IEE Japan*, 119-C(12):1528-1534 (1999).

Kempainen, "Optical Networking lightens carrier-backbone burden," *EDN*, pp. 63, 64, 65, 66, 68, 70, 72 (Oct. 8, 1998).

Thomas, et al., "Physics in the Whirlwind of Optical Communications," *Physics Today*, pp. 30-36 (Sep. 2000).

Press Release entitled "Lucent Technologies announces record-breaking 320-channel optical networking system," (pp. 1-2) (Apr. 17, 2000).

Iannone, et al., "A 160-km transparent metro WDM ring network featuring cascaded erbium-doped waveguide amplifiers," published by Optical Society of America (2000).

"Performance Management—Management of SONET Networks—White Paper," Clear Communications, *Sonet and Performance Management*, Issue 1, Apr. 1996 (pp. 1-21).

Cisco Wavelength Router Manager—Data Sheet, www.cisco.com/warp/public/cc/so/neso/olso/cwrm_ds.htm (Apr. 25, 2001).

Keyserling, A. and R.C.L., "Chapter 2: Number, Dimensions, Manderlbrot, Chaos, 4 Attractors, Music and Color," www.chanceandchoice.com/ChanceandChoice/chapter2.html.

Gallardo, et al., "Fast Simulation of Broadband Telecommunications Networks Carrying Long-Range Dependent Bursty Traffic," Proceedings of the 1999 Winter Simulation Conference, pp. 374-381 (Winter 1999).

Willinger, et al., "Self-Similarity Through High-Variability: Statistical Analysis of Ethernet LAN Traffic at the Source Level," pp. 1-31 (Apr. 15, 1997).

Decotignie, J.D., et al., "Producer-Distributor-Consumer Model on Controller Area Network," Proceedings of the IFAC/IFIC Workshop, Real Time Programming, 1995, pp. 35-42, XP002074139, Oxford, Great Britain.

International Search Report for PCT/US01/46225.

Liew, "A Broad-Band Optical Network Based on Hierarchical Multiplexing of Wavelengths and RF Subcarariers," *Journal of Lightwave Technology*, 7(11):1825-1838 (1989).

Al-Raweshidy and Komaki (Editors), "Basic Microwave Properties of Optical Links," *Radio Over Fiber Technologies for Mobile Communication Networks*, pp. 7-16 (Published by Artech House, Norwood, Massachusetts) (2002).

Fibre Channel Overview http://his.web.cern.ch/HIS/fcs/spec/overview.htm, pp. 1-10 (Nov. 5, 2002).

Ethernet FAST Ethernet Fiber Optic Media Converters, http://www.versitron.com/Ethernet.html, 2 pages (Nov. 5, 2002).

HomeNetHelp.com, http://www.homenethelp.com/web/explain.about-hubs-and-switches.asp, 5 pages (Nov. 5, 2002).

Fibre Channel, http://www.iol.unh.edu/training/fc/fc_tutorial.html, 22 pages (Nov. 5, 2002).

International Search Report in related Application No. PCT/US03/30326.

International Search Report in related Application No. PCT/US03/29970.

International Search Report in related Application No. PCT/US03/03310.

International Search Report in related Application No. PCT/US03/03329.

International Search Report in related Application No. PCT/US03/10053.

* cited by examiner

VEHICULAR COMMUNICATION SYSTEM

FIELD OF THE INVENTION

This invention relates to communication systems generally, and more particularly to communication systems using light signals to control electrical transmission and reception.

BACKGROUND OF THE INVENTION

It has long been recognized that aircraft and other vehicles operate most efficiently when their weight is minimized. A major contributor to the weight of modern vehicles is the load of communication equipment, including antennas, transmitters, receivers, controllers, input devices such as microphones and cameras, output devices such as monitors and headphones, and transmission lines interconnecting the various elements of the communications system.

In order to reduce weight associated with the communication systems of vehicles, it is common to use full duplex operation of signal paths, so that the transmitted and received signals travel, in opposite directions, over the same transmission lines, thereby saving a substantial portion of the weight associated with transmission paths for the other direction of transmission. A major problem with use of a full-duplex transceiver with an associated antenna is the large dynamic range necessary to isolate the high-level transmitted signal from the low-level received signal. In a transmission path, the presence of unavoidable reflections due to variations in the characteristics of the signal path converts signals flowing in a particular direction into reflected signals which flow in a retrograde direction. The problem of reflections is particularly severe in optical fiber transmission paths.

Improved communication systems are desired.

SUMMARY OF THE INVENTION

A communication system according to an aspect of the invention includes a set of electromagnetic/electrical transducers. This set may contain as few as one electromagnetic/electrical transducer. Each of the transducers signals between free space and at least one associated electrical port. The communication system includes a plurality of sources and sinks (including receivers) of optical communications signals. The optical communications signals may be analog or digital, and may include control signals. These control signals include signals for controlling the transmitters and receivers, as by selecting frequency, bandwidth, and/or power.

The communications signals and the control signals are generated or received at optical ports. The communication system also includes a set of transmitters and receivers, which set may include only one of a transmitter and a receiver, which is to say only a single transmitter, a single receiver, or both a single transmitter and a single receiver. Each one of the transmitters and receivers of the set of transmitters and receivers includes a first electrical port and a light port. Each one of the transmitters converts light signals applied to the light port into electrical signals at the first electrical port. The converting of light signals into electrical signals may be accompanied by frequency conversion under the control of the control signals. Depending upon the types of signals, each of the transmitters may accept digital light signals, and produce analog electrical signals. Each one of the receivers converts electrical signal applied to its electrical port into light signals at its light port, with frequency conversion, if appropriate, under the control of the control signals, and with analog-to-digital conversion if appropriate. The communication system also includes an optical communication bus coupled to the light signal ports of the sources and sinks of optical communications signals, and of the light ports of the transmitters and receivers, for coupling the communications and associated control signals among the sources, sinks, transmitters and receivers. As a result of these connections, light signals can be communicated at least from the sources to the transmitters and receivers and from the receivers to the sinks. A plurality of electrical-to-light converters are included in the communication system. Each of the electrical-to-light converters includes an electrical port and a light port, and converts electrical signals applied to the electrical port into light signals at the light port. Some of the electrical-to-light converters have their electrical ports coupled to the electromagnetic/electrical transducers. Others of the electrical-to-light converters have their electrical ports coupled to the first electrical ports of the transmitters. The communication system further includes a plurality of light-to-electrical converters. Each of the light-to-electrical converters includes a light port and an electrical port, for converting light signals applied to the light port into electrical signals at the electrical port. Some of the light-to-electrical converters have their electrical ports coupled to the electromagnetic/electrical transducers. Others of the light-to-electrical converters have their electrical ports coupled to the electrical ports of the receivers. The communication system includes a bidirectional optical communication link or optical fiber communication path extending between the light ports of the electrical-to-light converters and the light ports of the light-to-electrical converters.

In a particular embodiment of the invention, each of the electromagnetic/electrical transducers comprises an antenna. In another version of the invention, each of the transmitters includes a further electrical port, and an electrical transmitter portion extending between the first electrical port and the further electrical port; in this other version, a light-to-electrical signal converter is coupled between the light port of the transmitter and the further electrical port, for transducing or converting light arriving from the bus into electrical signals for the electrical transmitter portion.

In a further manifestation of the invention, a communication system further comprises an amplifier coupled to the electrical port of the light-to-electrical converter, for amplifying electrical signals flowing toward the electromagnetic/electrical transducers. In another avatar, the communication system further includes a circulator coupled to the electromagnetic/electrical transducers, and to the electrical ports of some of the electrical-to-light converters and light-to-electrical converters.

BRIEF DESCRIPTION OF THE DRAWING

FIG. 4b illustrates an alternative arrangement for a portion of FIG. 4a;

DESCRIPTION OF THE INVENTION

Figure 1:
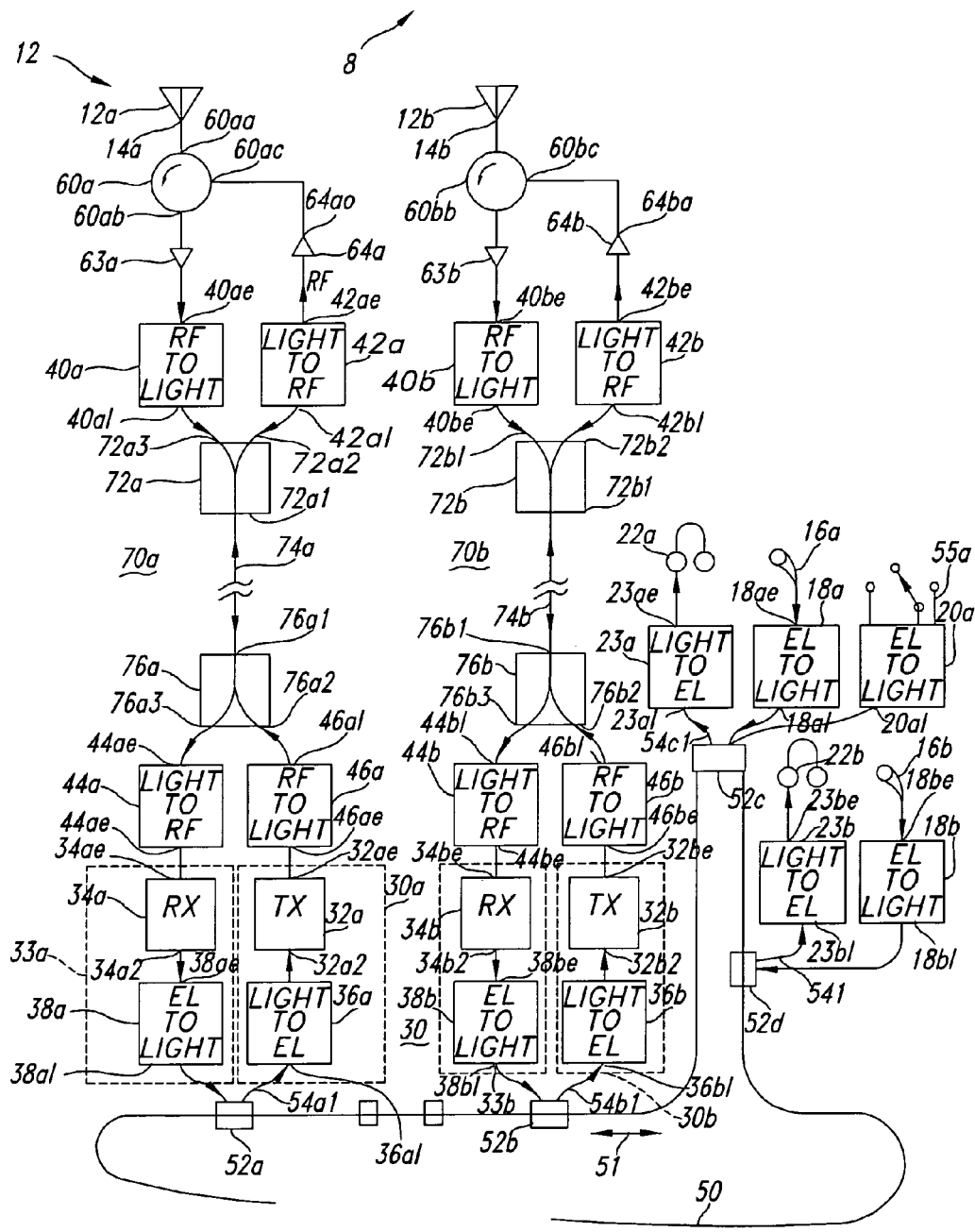
FIG. 1 is a simplified diagram, in block and schematic form, of a communication system according to an aspect of the invention.

In FIG. 1, a communication system 10 includes a set 12 of antennas 12a, 12b, . . . , each of which includes a "feed" port 14a, 14b . . . . Those skilled in the art know that antennas are transducers, which transduce signals between unguided electromagnetic form in free space, indicated by the arrow 8, and guided electrical waves at the ports 14a, 14b. . . . Those skilled in the art also know that antennas are reciprocal devices, which have the same characteristics, such as beam width, pattern shape, and gain, in both transmitting and receiving modes of operation. The "feed" terminology for the port of an antenna is from an earlier time, when the reciprocity of transmission and reception were not as well known, but such language is now standard. The feed port is the port to which signals are applied for transmission, and from which received signals are taken.

In FIG. 1, the feed port 14a of antenna 12a is connected to an antenna port 60aa of a circulator 60a. Received electrical signals are coupled from the antenna to port 60aa, and are circulated to circulator port 60ab and to a low-noise amplifier 63a. Low-noise amplifier 63a amplifies the electrical signals, and applies the amplified signals to an electrical input port 40ae of a radio-frequency (RF) or electrical-to-light converter 40a. The term "radio-frequency" formerly had a meaning which was restricted to a frequency range extending from about 550 KHz to 1600 KHz, but more recently has come to mean any frequency extending from above audio frequencies (about 20 to 30 KHz) to lower infrared frequencies. Circulator 60a also receives amplified RF signals from a power amplifier 64a at a port 60ac, and circulates such signals to antenna port 14a, for transmission by antenna 12a of the amplified RF signals from amplifier 64a. Similarly, the feed port 14b of antenna 12b is connected to an antenna port 60ba of a circulator 60b. Received electrical signals are coupled from the antenna to port 60ba, and are circulated to circulator port 60bb and to a low-noise amplifier 63b. Low-noise amplifier 63b amplifies the electrical signals, and applies the amplified signals to an electrical input port 40be of a radio-frequency (RF) or electrical-to-light converter 40b. Circulator 60b also receives amplified RF signals from a power amplifier 64b at a port 60bc, and circulates such signals to antenna port 14b, for transmission by the antenna 14b of the amplified RF signals from amplifier 64b.

An optical communication bus 50 in FIG. 1 carries optical communication signals bidirectionally, as suggested by double-headed arrow 51, between, or among, a plurality of nodes 52a, 52b, 52c, 52d, . . . Node 52c includes an optical directional coupler, such as a star or fused-fiber coupler, which directs signals arriving at the node over an optical fiber 54c1 to a light-to-electrical signal converter 23a. Such optical communication systems are well known, and details are omitted; it should be noted, however, that messages or signals to be transmitted from one location to another by way of different nodes are given codes which identify at least the destination address, so that equipments to which the messages are not directed can ignore them. Light-to-electrical signal converter 23a converts the light signals so received into electrical form, and possibly converts from digital form to analog form, and applies the resulting electrical signals to a utilization device, which is illustrated as a headphone 22a of a pair of headphones. A microphone, illustrated as 16a, is associated with node 52a. Microphone 16a produces electrical signals, which are applied to an electrical input port 18ae of an electrical-to-light converter 18a. A controller illustrated as a mechanical switch 55a represents a source of commands associated with the communication signals handled by converters 23a and 18a; the commands may represent an RF frequency of a carrier on which the associated communication signals are to be transmitted, or the frequency of a receiver at which communication signals applied to the headphones are to be received on. In any case, the command signals should include destination coding to identify that one of the transmitters 32a, 32b or receivers 34a, 34b for which the message is destined, so that the appropriate equipment acts on the message. The command signals may also represent the antenna from which the signals are to be transmitted, or on which they are to be received, the signal power, amplification, or any such parameter. The command signals originating from the sources represented by switch 55a are coupled to the electrical input port of an electrical-to-light converter 20a, for producing corresponding light signals at a light output port 20a1, which light signals are applied over another local optical fiber path to node 52c for communication over the optical communication path 50. Similarly, node 52d includes an optical directional coupler, which directs signals arriving at the node over a local optical fiber 54d1 to a light-to-electrical signal converter 23b. Light-to-electrical signal converter 23b converts the light signals so received into electrical form, and possibly converts from digital form to analog form, and applies the resulting electrical signals to another utilization device, which is illustrated as a headphone 22b of a pair of headphones. A microphone, illustrated as 16b, is associated with node 52b. Microphone 16b represents another source of electrical communication signals, which are applied to an electrical input port 18be of an electrical-to-light converter 18b. Electrical-to-light converter 18b converts the electrical signals produced by the source represented by microphone 16b into light form, and couples the light signals so generated or converted from light output port 18b1 to node 52d, for transmission to the other nodes 52a, 52b, 52c, . . . of the optical communication system 50.

In FIG. 1, node 52a of optical communication system 50 includes an optical directional coupler, which directs signals arriving at node 52a over a local optical fiber 54a1 to the light input port 36a1 of a light-to-electrical signal converter 36a. Light-to-electrical signal converter 36a is part of a light-in, electrical-out transmitter (TX) 30a. Light-to-electrical signal converter 36a converts the light signals received from node 52a into electrical form, and possibly converts from digital form to analog form, and applies the resulting electrical signals to the electrical input port 32a2 of an electrical-in, electrical-out transmitter 32a, which receives the command or control signal component, and selects some transmitter characteristic, such as carrier frequency or modulation type (that is, amplitude modulation, frequency modulation, code modulation, phase modulation, or the like), and processes the communication component of the signals received from light-to-electrical converter 36a in accordance with the commands. In the embodiment illustrated in FIG. 1, the signal output power of the transmitter is lower than the sum of the desired transmitted powers, so power amplifier 64a is provided near the antenna to boost the power to the desired level. For this purpose, the power-level component of the command or control signals may be passed from transmitter 32a (suitably modulated, if necessary) on toward amplifier 64a, and the amplifier may be provided with an appropriate circuit for extracting the command component and executing the commanded power. In any case, the modulated communication signals in electrical form are generated at the electrical output port 32ae of transmitter 32a. Similarly, node 52b of optical communication system 50 includes an optical directional coupler, which directs signals arriving at node 52b over an optical fiber 54b1 to the light input port 36b1 of a light-to-electrical signal converter 36b. Light-to-electrical signal converter 36b is part of a light-in, electrical-out transmitter (TX) 30b. Light-to-electrical signal converter 36b converts the light signals received from node 52b into electrical form, and possibly converts from digital form to analog form, and applies the resulting electrical signals to the electrical input port 32b2 of an electrical-in, electrical-out transmitter 32b, which, as described above in the case of transmitter 32a, receives the command or control signal component, and processes the communication component of the signals received from light-to-electrical converter 36b in accordance with the commands. As described above, the power output of transmitter 32b may be low, and power is provided by an additional amplifier 64b, which may be controlled. In any case, the modulated communication signals in electrical form are generated at the electrical output port 32e of transmitter 32b.

A receiver (RX) 33a at the left of FIG. 1 receives electrical signals received by antenna 12a, possibly amplified by low-noise amplifier 63a, and provides conventional receiver processing, such as down-conversion and demodulation, and/or filtering, all under the control of the command signals flowing over the communication system 50. Thus, operation of the controls represented by switch 55a can, in addition to controlling the characteristics of transmitter 32a, also control the receiving characteristics of receiver 34a. For this purpose, the control signals are routed by a path (not illustrated) from light-to-electrical converter 36a to receiver 34a. The processed received signals are coupled from electrical output port 34a2 of receiver 34a to the electrical input port 38ae of electrical-to-light converter 38a. Electrical-to-light converter 38a converts the electrical signals received at its electrical input port 38ae into light signals, and couples the resulting light signals from light output port 38a1, by way of node 52a, to optical communication system 50. Once the received signals are available on bus 50, they may be used by any of the utilization devices, represented by headphones 22a and 22b, which are coupled to the bus 50. Similarly, receiver (RX) 33b of FIG. 1 receives electrical signals previously received by antenna 12b, possibly amplified by low-noise amplifier 63b, and provides conventional receiver processing, such as down-conversion and demodulation, and/or filtering, all under the control of the command signals flowing over the communication system 50. The processed received signals are coupled from electrical output port 34b2 of receiver 34b to the electrical input port 38be of electrical-to-light converter 38b. Electrical-to-light converter 38b converts the electrical signals received at its electrical input port 38be into light signals, and couples the resulting light signals from light output port 38b1, by way of node 52b, to optical communication system 50.

In order to couple signals to be transmitted from the electrical output ports 46a1, 46b1 of transmitters 30a and 30b, respectively, to antennas 12a and 12b, respectively, and to couple received signals from antennas 12a and 12b to receivers 33a and 33b, respectively, optical communication paths are provided. More particularly, an optical communication path designated generally as 70a includes an optical fiber communication path 74a, which is connected to a first optical coupler 72a on the side nearest the antenna 12a, and to a second to optical coupler 76a on the side remote from the antenna. Optical coupler 72a has optical ports 72a1, 72a2, and 72a3, and is provided to route signals applied to port 72a1 to port 72a2, and to route signals applied to port 72a3 to port 72a1. In order to accomplish this routing, coupler 72a could be a directional coupler such as a star coupler or fused-fiber coupler for separating the signals based on their direction of propagation, or, if the transmitted and received signals are at different frequencies, the coupler 72a may be a filter, which separates the signals based on their frequencies. Similarly, optical coupler 76a has optical ports 76a1, 76a2, and 76a3, and is provided to route signals applied to port 76a2 to port 76a1, and to route signals applied to port 76a1 to port 76a3. Thus, optical signals applied to port 76a2 of coupler 76a of optical path 70a are coupled from port 72a2 of coupler 72a, and optical signals applied to port 72a3 of coupler 72a of optical path 70a are coupled from port 76a3 of coupler 76a.

Similarly, optical fiber communication path 70b includes optical fiber path 74b, and couplers 72b and 76b. Optical coupler 72b has optical ports 72b1, 72b2, and 72b3, and is provided to route signals applied to port 72b1 to port 72b2, and to route signals applied to port 72b3 to port 72b1. Coupler 72b may be a directional coupler or a filter, as described above. Optical coupler 76b has optical ports 76b1, 76b2, and 76b3, and is provided to route signals applied to port 76b2 to port 76b1, and to route signals applied to port 76b1 to port 76b3. Thus, optical signals applied to port 76b2 of coupler 76b of optical path 70b are coupled from port 72b2 of coupler 72b, and optical signals applied to port 72b3 of coupler 72b of optical path 70b are coupled from port 76b3 of coupler 76b.

Optical fiber communication path 70a of FIG. 1 is coupled to the electrical components at its ends. More particularly, electrical output port 32ae of transmitter 30a is coupled to an electrical input port 46ae of an electrical-to-light converter 46a, which converts the electrical signals to be transmitted into light signal form, and couples the light signals from light output port 46a1 to light input port 76a2 of coupler 76a. The light signals flow through optical fiber communication path 70a to light output port 72a2 of coupler 72a, and are applied to the light input port 42a1 of a light-to-electrical converter 42a. Light-to-electrical converter 42a converts the light signals representing electrical signals to be transmitted into electrical form, and applies the resulting electrical signals from electrical output port 42ae to the input port of amplifier 64a. The amplified signal from the amplifier 64a is coupled through circulator 60a to antenna 12a for radiation from the antenna. Received electrical signals amplified by low-noise amplifier 63a are applied to the electrical input port 40ae of an electrical-to-light converter 40a, which converts the received signals into light form. The resulting light signals are coupled from light output port 40a1 to light input port 72a3 of coupler 72a. The light signals representing received signals are coupled through optical fiber path 74a to common port 76a1 of coupler 76a, and are routed within the coupler to port 76a3. The light signals exiting from port 76a3 of coupler 76a are applied to the light input port 44a1 of a light-to-electrical converter 44a, and are converted into electrical signals representing the signals received by antenna 12a. The electrical output signals are coupled from electrical output port 44ae of light-to-electrical converter 44a are coupled to electrical input port 34ae of receiver 33a.

Similarly, optical fiber communication path 70b of FIG. 1 is coupled to the electrical components at its ends. More particularly, electrical output port 32be of transmitter 30b is coupled to an electrical input port 46be of an electrical-to-light converter 46b, which converts the electrical signals to be transmitted into light signal form, and couples the light signals from light output port 46b1 to light input port 76b2 of coupler 76b. The light signals flow through optical fiber communication path 70b to light output port 72b2 of coupler 72b, and are applied to the light input port 42b1 of a light-to-electrical converter 42b. Light-to-electrical converter 42b converts the light signals representing electrical signals to be transmitted into electrical form, and applies the resulting electrical signals from electrical output port 42be to the input port of amplifier 64b. The amplified signal from amplifier 64b is coupled through circulator 60b to antenna 12b for radiation from the antenna. Electrical signals received by antenna 12b and amplified by low-noise amplifier 63b are applied to the electrical input port 40be of an electrical-to-light converter 40b. Electrical-to-light converter 40b converts the received signals into light form. The resulting light signals are coupled from light output port 40b1 to light input port 72b3 of coupler 72b. The light signals representing received signals are coupled through optical fiber path 74b to common port 76b1 of coupler 76b, and are routed within the coupler to port 76b3. The light signals exiting from port 76b3 of coupler 76b are applied to the light input port 44b1 of a light-to-electrical converter 44b, and are converted into electrical signals representing the signals received by antenna 12b. The electrical output signals are coupled from electrical output port 44be of light-to-electrical converter 44b are coupled to electrical input port 34be of receiver 33b.

With the described connections, the arrangement of FIG. 1 uses optical fiber paths for all low-power signal routing, which provides an improvement in weight over the alternative, which includes use of coaxial cable (or rigid waveguide). The optical bus arrangement provides more flexibility in routing of signals than does the use of fixed coaxial cables. Further, high-amplitude signals occur in the system of FIG. 1 only between the output port 64ao of amplifier 64a and the antenna port 14a, and between the output port 64bo of amplifier 64b and the antenna port 14b. As such, only low-level signals traverse the optical fiber paths of optical communication system 50 and of the optical paths 70a, 70b. Since high-amplitude (or high-level) signals do not traverse common paths with low-amplitude (low-level) signals (except in the antenna couplers illustrated as 60a, 60b in FIG. 1, and the associated antenna paths), reflections of high-level signals in optical fibers cannot occur, with consequent improvement in the isolation. The isolation is established by the directivity of the couplers 72a and 76a. The isolation provided by these couplers, if based solely on the direction of propagation of the light, may be insufficient for some applications.

Figure 2A:
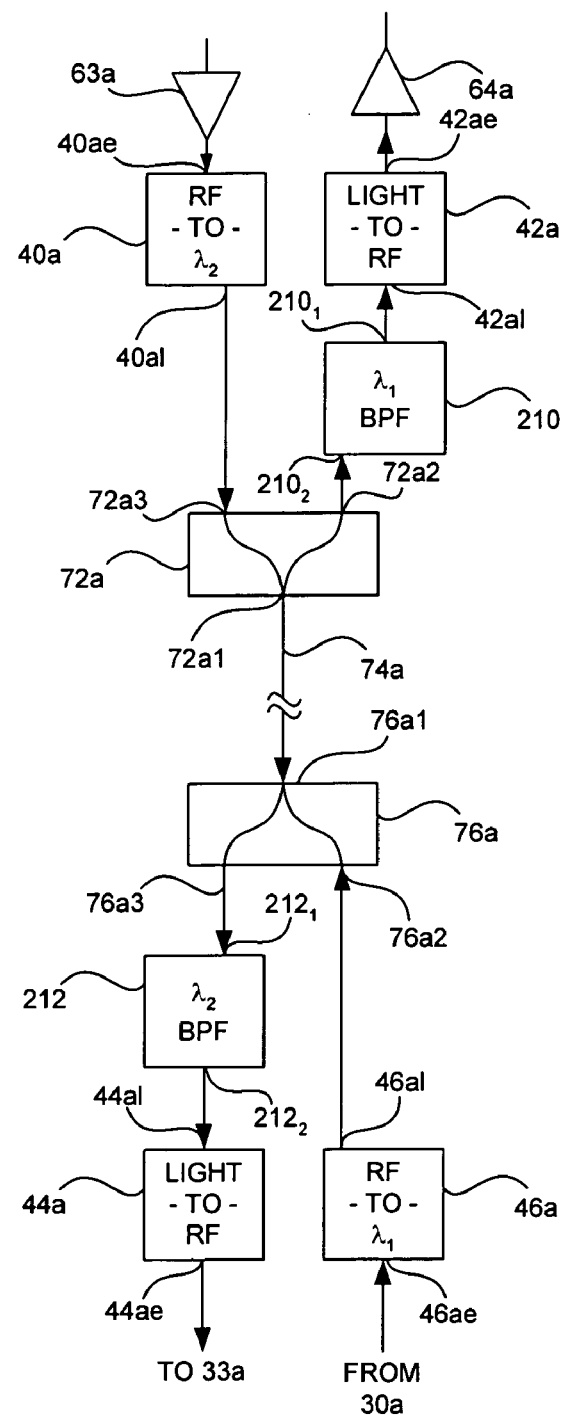
FIG. 2*a* is a simplified diagram, in block and schematic form, of a portion of the arrangement of FIG. 1, modified to include optical filters, which are used in conjunction with the optical directional couplers to provide additional isolation between the signals to be transmitted and the received signals as the signals traverse the two separate channels.

FIG. 2a is a simplified block diagram of a portion of the arrangement of FIG. 1 including optical fiber communication path 74a, taken as typical of any of the optical fiber communication paths of FIG. 1, modified to include optical filters. These optical filters are used in conjunction with the optical directional couplers to provide additional isolation between the signals to be transmitted and the received signals as the signals traverse the two separate channels (signal up to the antenna for transmission and received signals down from the antenna). In FIG. 2a, elements corresponding to those of FIG. 1 are designated by the same reference alphanumerics. The arrangement of FIG. 2a differs from that of FIG. 1, in part, in that the electrical signal flowing from transmitter 30a to input electrical port of electrical-to light converter 46a produces light at a particular wavelength $\lambda_1$, which is applied to light port 76a2 of optical directional coupler 76a. It should be noted that wavelength ($\lambda$) and frequency (F) are related by the speed of light C in the medium through which the electromagnetic energy flows, with $\lambda=C/F$ and $F=C/\lambda$, and specification of either F or $\lambda$ specifies the other. An optical bandpass filter (BPF) 212 is interposed between optical port 76a3 of coupler 76a and light port 44a1. Optical bandpass filter 212 passes a wavelength $\lambda_2$, but rejects, or does not pass, wavelength $\lambda_1$. Those skilled in the art know that the term "wavelength" in this context refers to a range of wavelengths, rather than to a single wavelength, but that the bandwidths of the signals involved are such that the width of the band is small relative to the center wavelength. Further, those skilled in the art know that terms such as "reject" and "do not pass" are relative terms, which impart the flavor of the theoretical function performed by a filter, but which ignore the limitations of real devices. Thus, the signals which are "passed" by a real filter are subject to some losses, and the signals which are "rejected" nevertheless pass through the filter at some level. Further, the term "bandpass" in this context includes filters which might be termed "band-reject," in that a filter which rejects $\lambda_1$, but does nothing else, will allow passage of $\lambda_2$. Thus, filter 212 of FIG. 2a is either a $\lambda_2$ bandpass filter or a $\lambda_1$ reject filter. Filters with other names may also be used in this context to provide the same effects. The presence of filter 212 prevents signals at $\lambda_1$, which are intended to flow upward through optical fiber communication path 74a, and which "leak" to port 76a3 of coupler 76a, from arriving at port 44a1 of light-to-RF converter 44a, and thereby contaminating the received signals.

The transmitted light signals at $\lambda_1$ which are coupled from RF-to-light converter 46a of FIG. 2a to port 76a2 of coupler 76a, are coupled onto optical fiber communication path 74a, arrive at directional coupler 72a, and are preferentially coupled to port 72a2. From port 72a2, the light signals representing signals to be transmitted are coupled through a $\lambda_1$ bandpass filter 210, or at, least a $\lambda_2$ reject filter, to light input port 42a1 of light-to-RF converter 42a. The light signal is converted to RF, and is applied to the input port of power amplifier 64a, as described in conjunction with FIG. 1. As so far described, the requirement that RF-to-light converter 46a produce its light at wavelength $\lambda_1$, together with the addition of $\lambda_2$ bandpass filter to the arrangement of FIG. 1, helps to increase the isolation of the downward-going information streams (the received signals) from the signals to be transmitted. However, as so far described, there is no explicit additional isolation of the upwardly directed (signals to be transmitted) signals from the received signals.

As further illustrated in FIG. 2a, an additional requirement is imposed on RF-to-light converter 40a, so that converter 40a produces light only at wavelength $\lambda_2$. With this additional limitation, any received signals at $\lambda_2$ which "leak" through light coupler 72a, which refers to signals which flow from port 72a3 to port 72a2, are rejected by $\lambda_1$ bandpass filter 210, and are lost, or reflected back to the coupler. The signals at $\lambda_1$ which may arrive at the light output port 40a1 of RF-to-$\lambda_2$ converter 40a have no effect on the converter 40a. Similarly, the signals at $\lambda_2$ which may arrive at the light output port 46a1 of RF-to-$\lambda_1$ converter 46a have no effect on the converter 46a. Thus, additional isolation is achieved in the arrangement of FIG. 2a by operating the up and down paths through optical fiber communication path 74a at different wavelengths of light, and by using optical filters to aid in providing isolation.

Figure 2B:
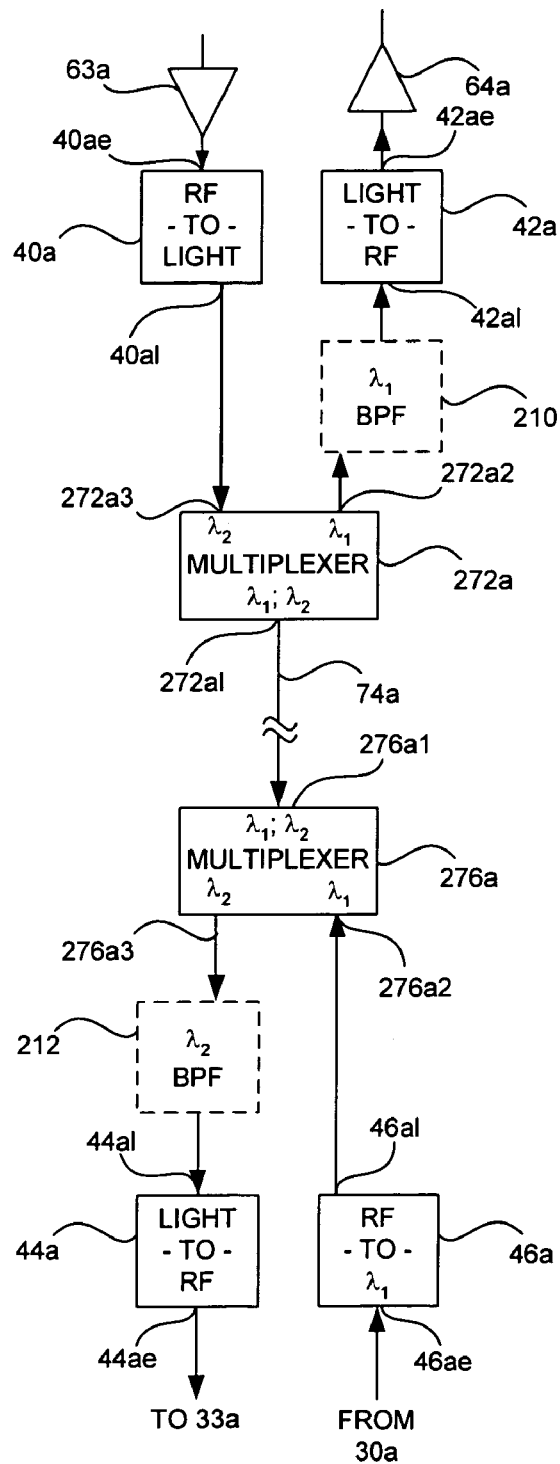
FIG. 2*b* is a simplified diagram, in block and schematic form, of a portion of FIG. 1 corresponding to that of FIG. 2*a*, modified by substituting optical multiplexing filters for directional couplers.

FIG. 2b is a simplified block and schematic diagram of an optical fiber communication path 74a portion of FIG. 1 corresponding to that of FIG. 2a, modified by substituting optical multiplexing filters for directional couplers. Elements of FIG. 2b corresponding to those of FIG. 2a are designated by like reference alphanumerics. In FIG. 2b, light at wavelength $\lambda_1$ is coupled to a $\lambda_1$ input port 276a2 of a wavelength multiplexer/demultiplexer (MUX/DEMUX) 276a, and is coupled to common port 276a1, rather than to port 276a3, by the wavelength-dependent characteristics of the multiplexer. The device 276a is termed a "multiplexer/demultiplexer" rather than just a multiplexer or demultiplexer, because it can perform both functions, depending upon how it is used. In the arrangement of FIG. 2b, MUX/DEMUX 276a is used to perform both functions. More particularly, MUX/DEMUX 276a is used to multiplex the light at wavelength $\lambda_1$ from port 276a2 onto optical fiber communication path 74a, and to demultiplex light at wavelength $\lambda_2$ from optical fiber communication path 74a to output port 276a3. At the upper end of path 74a, as illustrated in FIG. 2b, another multiplexer/demultiplexer MUX/DEMUX 272a receives light at wavelength $\lambda_2$ at its input port 272a3, and multiplexes the light onto path 74a. Light at wavelength $\lambda_1$, arriving at common port 272a1 of MUX/DEMUX 272a is routed to port 272a2. The MUX/DEMUX 272a and 276a of FIG. 2b are wavelength-selective, and so provide isolation of the signals to be transmitted from the received signals. If more isolation should be needed, $\lambda_1$ BPF filter 210 may be interposed between port 272a2 of MUX/DEMUX 272a and light input port 42a1 of light-to-RF converter 42a, and $\lambda_2$ BPF filter 212 may be interposed between port 276a3 of MUX/DEMUX 276a and light input port 44a1 of light-to-RF converter 44a. The use of multiplexer/demultiplexers provides the possibility of additional channels extending through the optical fiber communication path 74a.

Figure 2C:
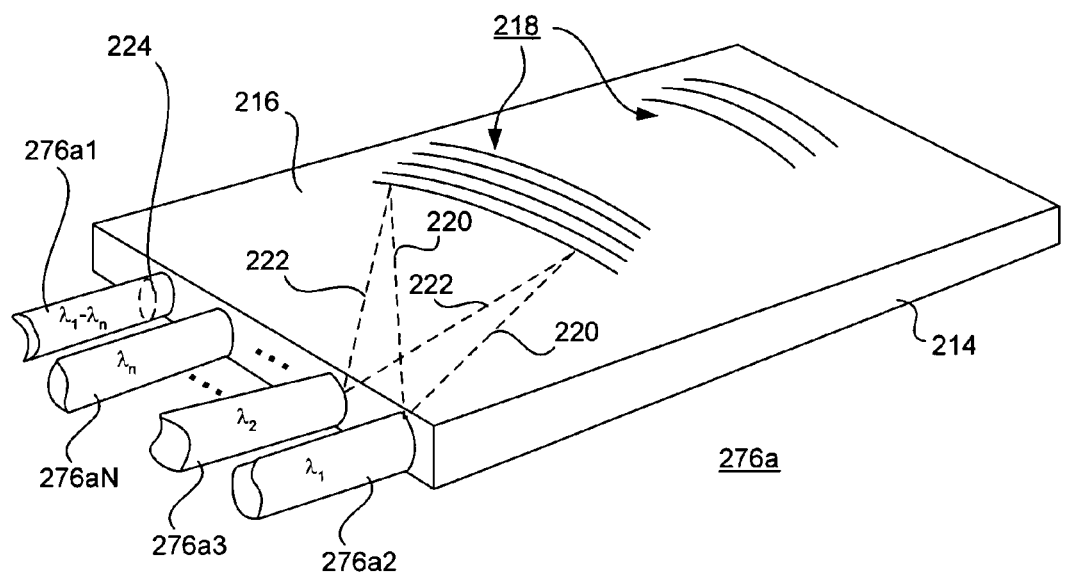
FIG. 2c is a simplified perspective or isometric view of a planar grating wavelength-dependent multiplexer/demultiplexer of a type which may be used in the arrangement of FIG. 2b, the arrangement of FIG. 2d represents another multiplexer/demultiplexer of a type which may be used in the arrangement of FIG. 2b.

FIG. 2c is a simplified perspective or isometric view of a planar grating wavelength-dependent multiplexer/demultiplexer which may be used in the arrangement of FIG. 2b. In FIG. 2c, light at wavelengths $\lambda_1, \lambda_2, \lambda_3 \ldots, \lambda_N$ enters body 214 of multiplexer/demultiplexer 276a at a common input port or fiber 276a1, and is focused, if necessary, by a lens 224. A plurality of shallow reflective grating arrays, designated as 218, are formed in the upper surface 216 of body 214. The grating arrays are curved, so that the light reflected at each of the various wavelengths $\lambda_1, \lambda_2, \lambda_3 \ldots, \lambda_N$ is focused onto a particular output port or fiber 276a2, 276a3, $\ldots$, 276a(N+1). For example, light at wavelength $\lambda_1$ which enters port 276a1 is transmitted to the grating arrays 218, and is reflected, as suggested by dot-dash lines 220, to port or fiber 276a2. Light at wavelength $\lambda_2$ which enters port 276a1 is transmitted to the grating arrays 218, and is reflected, as suggested by dash-lines 222, to port or fiber 276a3. Similarly, light at other frequencies is reflected by the gratings 218 to other ports or fibers, as for example light at wavelength $\lambda_N$ is reflected to port 276a(N+1). To operate as a multiplexer, light at the indicated frequencies is applied to the corresponding ones of the ports 276a2, 276a3, $\ldots$, 276a(N+1), and the light from all of those ports is reflected by the gratings 218 to single port or fiber 276a1.

Figure 2D:
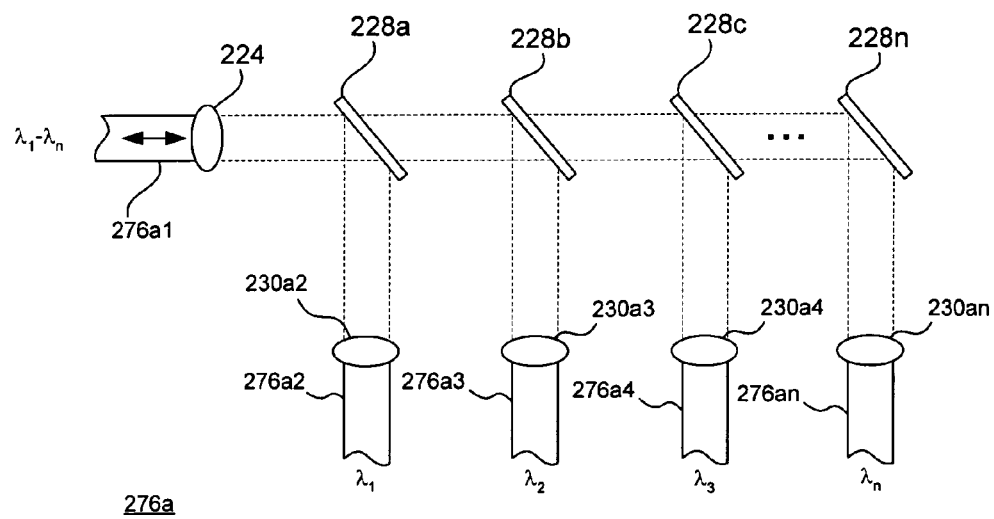
FIG. 2e is a simplified representation of yet another multiplexer/demultiplexer which may be used in the arrangement of FIG. 2b.
FIG. 2f represents the frequency characteristics or spectral response of an optical multiplexer.

The arrangement of FIG. 2d represents another multiplexer/demultiplexer which may be used in the arrangement of FIG. 2b. In FIG. 2d, the common port or fiber is 276a1, in which light flows at wavelengths $\lambda_1, \lambda_2, \lambda_3, \ldots, \lambda_N$. Lens 224 collimates the light, if necessary, to produce a light beam which "passes through" a plurality of dichroic filters 228a, 228b, 228c, $\ldots$ 228N. Each dichroic filter reflects at one of wavelengths $\lambda_1, \lambda_2, \lambda_3 \ldots, \lambda_N$, and transmits or passes light at other wavelengths. Light of the wavelength to which each filter is reflective does not pass through that filter, but is reflected instead. Each dichroic filter 228a, 228b, 228c, $\ldots$ 228N is associated with an output port, which in the arrangement of FIG. 2d comprises an optical fiber and a lens, if necessary. Individual wavelength ports 276a2, 276a3, 276a4, $\ldots$, 276aN are associated with dichroic filters 228a, 228b, 228c, $\ldots$, 228N, respectively, and each port 276a2, 276a3, 276a4, $\ldots$, 276a(N+1) is associated with a corresponding lens 230a2, 230a3, 230a4, $\ldots$, 230aN. As illustrated in the arrangement of FIG. 2d, dichroic filter 228a reflects light at $\lambda_1$, and the reflected light at $\lambda_1$ passes through lens 230a2 to fiber or port 276a2. Dichroic filter 228b reflects light at $\lambda_2$, and the reflected light at $\lambda_2$ passes through lens 230a3 to fiber or port 276a3, dichroic filter 228c reflects light at $\lambda_3$, and the reflected light at $\lambda_3$ passes through lens 230a4 to fiber or port 276a4, $\ldots$, and dichroic filter 228N reflects light at $\lambda_N$, and the reflected light at $\lambda_N$ passes through lens 230aN to fiber or port 276a(N+1). As with the arrangement of FIG. 2c, the MUX/DEMUX of FIG. 2d may be used with additional wavelength filters, if insufficient isolation between wavelengths is available in the MUX/DEMUX itself.

Figure 2E:
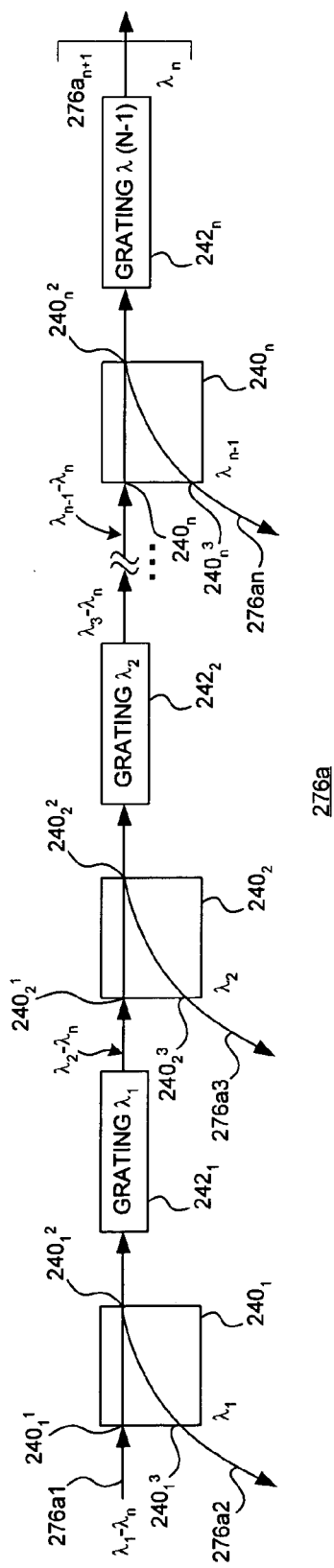

FIG. 2e is a simplified representation of yet another multiplexer/demultiplexer which may be used in the arrangement of FIG. 2b. In FIG. 2e, elements of multiplexer/demultiplexer 276a corresponding to those of FIG. 2b are designated by the same reference alphanumeric. Multiplexer/demultiplexer 276a of FIG. 2e has its common input port coupled to a port $240_1^1$ of a directional coupler $240_1$, where the subscript identifies the particular one of the directional couplers, and the superscript identifies the port. All of the input wavelengths $\lambda_1$ to $\lambda_N$ pass through to port $240_1^2$, and enter a grating $242_1$. Grating $242_1$ is an optical fiber with one or more arrays of grooves or regions of varying index of refraction, which are arranged to reflect light at wavelength $\lambda_1$, and pass light at all other wavelengths. The light at wavelength $\lambda_1$ which is reflected by grating 242, re-enters port $240_1^2$ of coupler $240_1$, and is coupled to, and exits from, port $240_1{}^3$. Thus, light at wavelengths extending from $\lambda_1$ to $\lambda_N$ enters the system, and light at wavelength $\lambda_1$ exits by way of port 276a2, while the remaining wavelengths of light, ranging from $\lambda_2$ to $\lambda_N$, continue on, and enter port $240_2{}^1$ of coupler $240_2$. Coupler $240_2$ couples the light at wavelengths ranging from $\lambda_2$ $\lambda_N$ to its output port $240_2{}^1$; and on to grating $242_2$. Grating $242_2$ reflects light at $\lambda_2$, and passes the remaining light, namely light having wavelengths ranging from $\lambda_3$ to $\lambda_N$. The reflected light at $\lambda_2$ re-enters port $240_2{}^1$ of coupler $240_2$, and is coupled to coupler output port $240_2{}^3$. Thus, of the wavelengths $\lambda_1$ to $\lambda_N$ which enter the multiplexer/demultiplexer 276a of FIG. 2e, $\lambda_1$ exits by port or fiber 276a2, $\lambda_2$ exits by port or fiber 276a3, and the remaining wavelengths $\lambda_3$ to $\lambda_N$ continue on to other portions of the structure. As illustrated in FIG. 2e, the last coupler is $240_N$, and the last grating is $242_N$. Light with wavelengths (N−1) and N enters port $240_{N1}$, of coupler $240_N$, and is coupled to its output port $240_N{}^2$, and on to grating $242_N$. Grating $242_N$ reflects wavelength $\lambda_{N-1}$, and passes wavelength $\lambda_N$ on to output port 276a (N+1). The reflected light at wavelength $\lambda_{N-1}$ re-enters port $240_N{}^2$ of coupler $240_N$, and is coupled to output port $240^{v2}$ and output fiber 276aN.

Figure 2F:
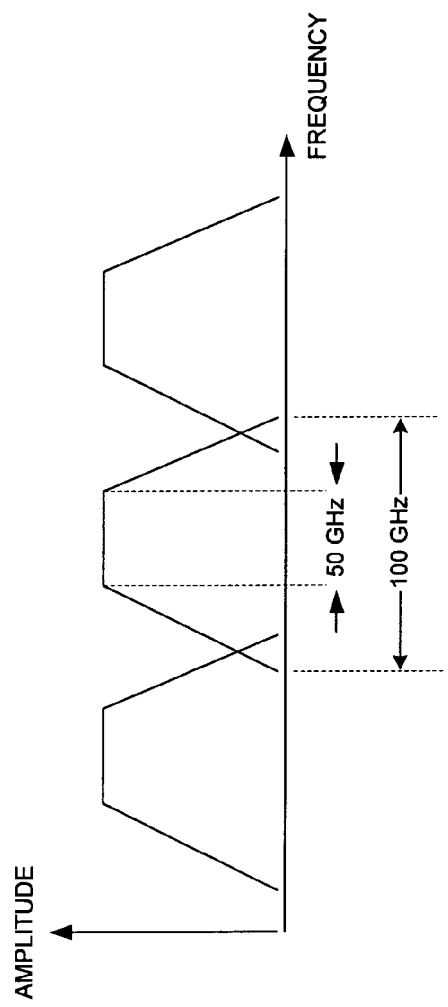

Thus, any of the three multiplexer/demultiplexers of FIG. 2c, 2d, or 2e can be used in the arrangement of FIG. 2b to perform wavelength or frequency multiplexing. While the descriptions of FIGS. 2a and 2b have been made as though only the optical fiber communication path 74a were applicable, the same modifications or changes may be made to optical fiber communication path 74b, or to any other such paths which are suggested by the ellipses of FIG. 1. FIG. 2f plots a portion of the amplitude-frequency characteristics of a multiplexer as described in conjunction with FIGS. 2f and 2e. In FIG. 2f, the response is in the form of a flat-topped peak centered on the light frequency in question. When the center frequencies of the light are in the vicinity of a frequency corresponding to a wavelength ($\lambda$) of 1550 nm and the increment of frequency from one center to the next corresponds to a wavelength in the vicinity of 0.8 nm, each flat-topped region represents a frequency passband of greater than 50 GHz. It should be understood that other types of MUX/DEMUX could be used instead of those described and illustrated.

Figure 3:
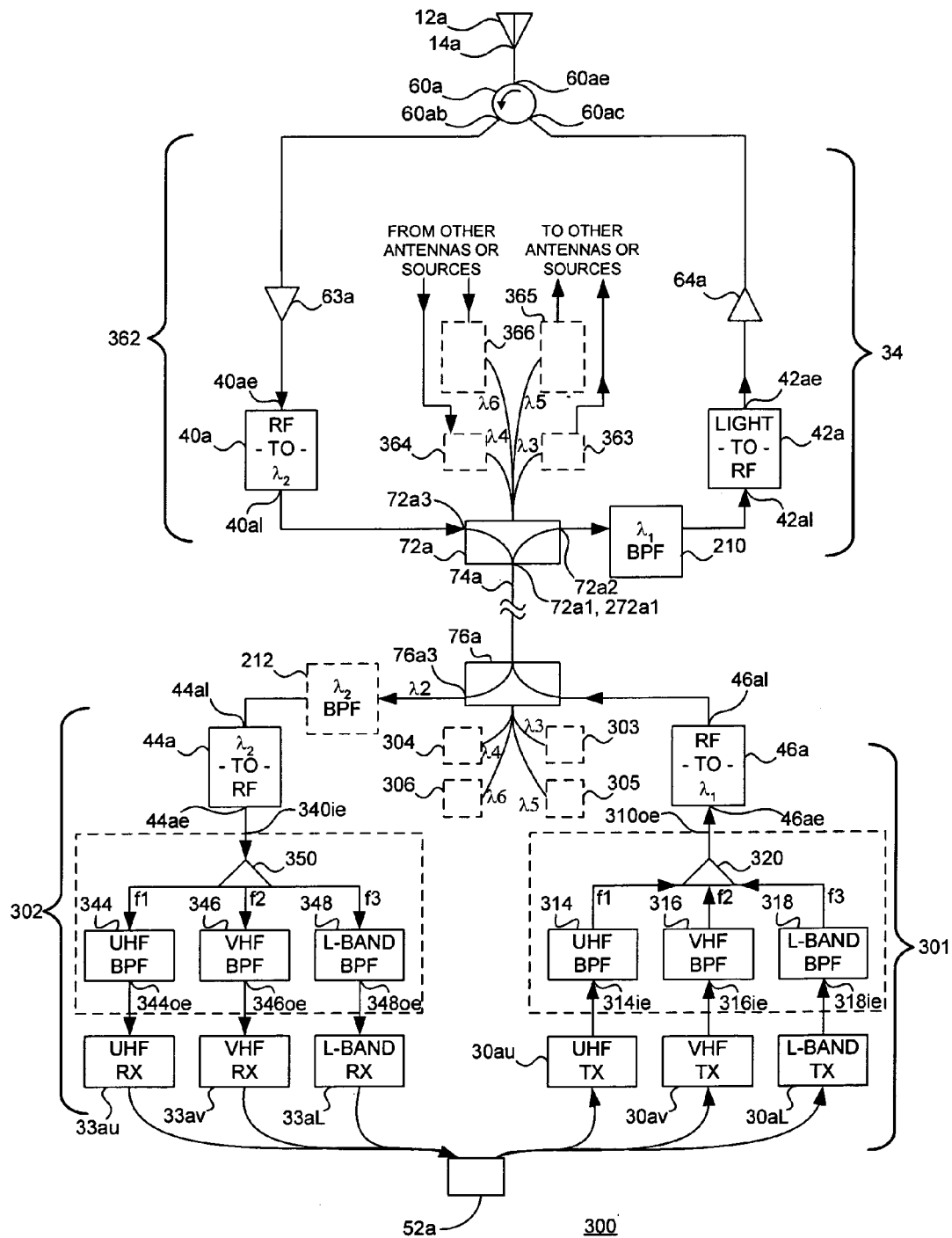
FIG. 3 is a simplified diagram in block and schematic form which includes plural transmitters and plural receivers, coupled to an antenna (or other source/sink) by a representative optical fiber communication path of FIG. 1.

As so far described, only a single transmitter frequency, and a single received frequency, are coupled over the optical fiber communication paths such as 74a, and there are thus two channels available. The arrangement of FIG. 3 includes plural transmitters and plural receivers, coupled to an antenna (or other source/load) by the optical fiber communication path. In FIG. 3, elements corresponding to those of FIGS. 1 and 2b are designated by like reference numerals. In particular, the couplers associated with optical fiber communication path 74a are designated with both numerals 72a and 272a, and numerals 76a and 276a, to thereby indicate that the couplers may be either directional couplers such as those described in conjunction with FIG. 1 or 2a, or multiplexers as described in conjunction with FIG. 2b, 2c, or 2d. The salient difference between the arrangement of FIG. 3 and those of FIGS. 1, 2a, and 2b is that the arrangement of FIG. 3 has plural transmitters (TX) and receivers (RX). More particularly, the transmitters include a UHF transmitter 30au, a VHF transmitter 30av, and an L-band transmitter 30aL. The term UHF refers to Ultra-High Frequency, and is generally applied to frequencies ranging from 300 to 3000 MHz, VHF refers to Very High Frequency, and is generally applied to frequencies in the range of 30 to 300 MHz. The term L-band is more specific, and refers to frequencies in the vicinity of 900 MHz. Each of the transmitters 30au, 30av, and 30aL includes a light input port which is coupled by an optical path to optical node 52a. Also, the arrangement of FIG. 3 includes a UHF receiver 33au, a VHF receiver 33av, and an L-band receiver 33aL. The light output ports of receivers 33au, 33av, and 33aL are coupled by way of a light path to node 52a. With these optical connections, the signals to be transmitted can be communicated from the various users over optical communication bus 50 (of FIG. 1) to the transmitters, and received signals can be communicated over the optical communication bus 50 to the various users.

Each transmitter 30au, 30av, and 30aL of FIG. 3 has its electrical output port coupled to an input port 314ie, 316ie, and 318ie, respectively, of UHF bandpass filter (BPF) 314, VHF bandpass filter 316, and L-band bandpass filter 318, respectively, so that the signals to be transmitted are filtered to reside within a particular bandwidth, and to isolate the transmitters from each other. The filtered signals at the outputs of bandpass filters 314, 316, and 318 are applied to input ports of a summing circuit designated 320, which sums the signals together, to produce electrical signals at UHF, VHF, and L-band. The summed signals are applied to an electrical input port of an RF-to-$\lambda_1$ electrical-to-light converter 46a. Light at $\lambda_1$, and modulated with the three UHF, VHF, and L-band signals is produced at light output port 46a1 of electrical-to-light converter 46a, and is coupled to input port 76a2 of coupler/multiplexer 76a1, 276a1. The light at $\lambda_1$, representing signals to be transmitted, is coupled over optical fiber communication path 74a, and is distributed by coupler/demultiplexer 72a1, 272a1 to light input port 42a1 of a light-to-RF converter 42a, by way of an optical $\lambda_1$ bandpass filter 210 if necessary. Light-to-RF converter 42a converts the light at $\lambda_1$ into RF, which RF signal has the three components UHF, VHF, and L-band. The three electrical components are applied to one or more amplifiers, illustrated together as 64a, and the resulting amplified signals are applied to port 14a of antenna 12a by way of circulator 60a.

RF signals received by antenna 12a at UHF, VHF, and L-band are coupled through circulator 60a and one or more low-noise amplifiers, illustrated together as an amplifier 63a, to an electrical input port 40ae of an RF-to-$\lambda_2$, converter 40a. Light at wavelength $\lambda_2$, modulated with the three bands of received RF signals, is coupled from output port 40a1 to an input port of coupler/multiplexer 72a, 272a, for coupling the light signals at $\lambda_2$ onto optical fiber communication path 74a. The light at $\lambda_2$, representing the received signals, is coupled through path 74a to the common port of coupler/demultiplexer 76a1, 276a1. Coupler/demultiplexer 76a1, 276a1 couples light signals at wavelength $\lambda_2$ to light input port 44a1 of $\lambda_2$-to-RF converter 44a. RF signals representing those signals received at UHF, VHF, and L-band are coupled from port 44ae of $\lambda_2$-to-RF converter 44a to electrical input port 340ie of demultiplexer 340. Within demultiplexer 340, the signals are coupled by an amplitude divider 350, or possibly a matching device, to a UHF bandpass filter 344, a VHF bandpass filter 346, and an L-band bandpass filter 348. Each bandpass filter passes its own band, and rejects other bands. Thus, the UHF signals exit from output port 344oe of UHF bandpass filter 344, and are applied to UHF receiver 33au, VHF signals exit from output port 346oe of VHF bandpass filter 346, and are applied to VHF receiver 33av, and L-band signals exit from output port 348oe of L-band bandpass filter 348, and are applied to L-band receiver 33aL. The receivers 33au, 33av, and 33aL perform ordinary receiver functions, such as downconversion, amplification, and demodulation, and the resulting information signals are converted into light form for transmission to node 52a. From node 52a, the information of the received signals can be distributed to any or all users of the optical communication bus 50 (of FIG. 1).

As so far described in conjunction with FIG. 3, the transmit light signals transmitting optical fiber communication path 74a are at wavelength $\lambda_1$, and the receive light signals are at wavelength $\lambda_2$. If the devices so far described as couplers/multiplexers or couplers/demultiplexers are restricted to being multiplexers/demultiplexers, more signals can be transmitted over optical fiber communication path 74a. For example, referring again to FIG. 3, let the general designation 301 represent UHF transmitter 30au, VHF transmitter 30av, L-band transmitter 30aL, multiplexer 310, and RF-to-$\lambda_1$ converter 46a. Also, let the general designation 302 represent $\lambda_2$-to-RF converter 44a, demultiplexer 340, UHF receiver 33au, VHF receiver 33av, and L-band receiver 33aL. Using these designations, multiplexer/demultiplexer 276a1 may be associated with other blocks 303, 305 corresponding to combination 301, but operating at transmit wavelengths $\lambda_3$ and $\lambda_5$, respectively, which are different from the transmit wavelength $\lambda_1$ at which combination 301 operates, and multiplexer/demultiplexer 276a1 is also associated with other blocks 304 and 306 corresponding to combination 302, but operating at different wavelengths $\lambda_4$ and $\lambda_6$, respectively, than wavelength $\lambda_2$ at which combination 302 operates.

Similarly, let the general designation 361 represent the combination of light-to-RF converter 42a and amplifier 64a, and bandpass filter 210 if used, and the general designation 362 represent the combination of RF-to-light converter 40a and amplifier 63a (and any associated bandpass filter). Using these designations, multiplexer/demultiplexer 272a1 may be associated with other blocks 363 and 365 corresponding to combination 361, but operating at transmit wavelengths $\lambda_3$, and $\lambda_5$, respectively, which are different from transmit wavelength $\lambda_1$ at which transmit combination 361 operates. Blocks 363 and 365 may be coupled to that input of circulators, corresponding to circulator 60a, associated with other antennas or sinks than antenna 12a, for thereby coupling transmit signal to such other antennas or sinks. In the same way, let the general designation 362 represent the receiving combination of amplifier 63a and RF-to-light converter 40a. Using this designation, multiplexer/demultiplexer 272a1 may be associated with other blocks 364 and 366 corresponding to combination 362, but operating at receive wavelengths $\lambda_4$ and $\lambda_6$, respectively, which are different from receive wavelength $\lambda_2$ at which receive combination 362 operates. Blocks 364 and 366 may be coupled to that output of circulators, corresponding to output 60ab of circulator 60a, associated with other antennas or sources than antenna 12a, for thereby coupling receive signal from such other antennas or sinks to multiplexer/demultiplexer 272a1. It will be apparent that this scheme allows wavelengths $\lambda_3$, $\lambda_4$, $\lambda_5$, and $\lambda_6$ to be transmitted over optical fiber communication path 74a together with wavelengths $\lambda_1$ and $\lambda_2$. Naturally, additional blocks may be added to further increase the information flow over path 74a.

Figure 4A:
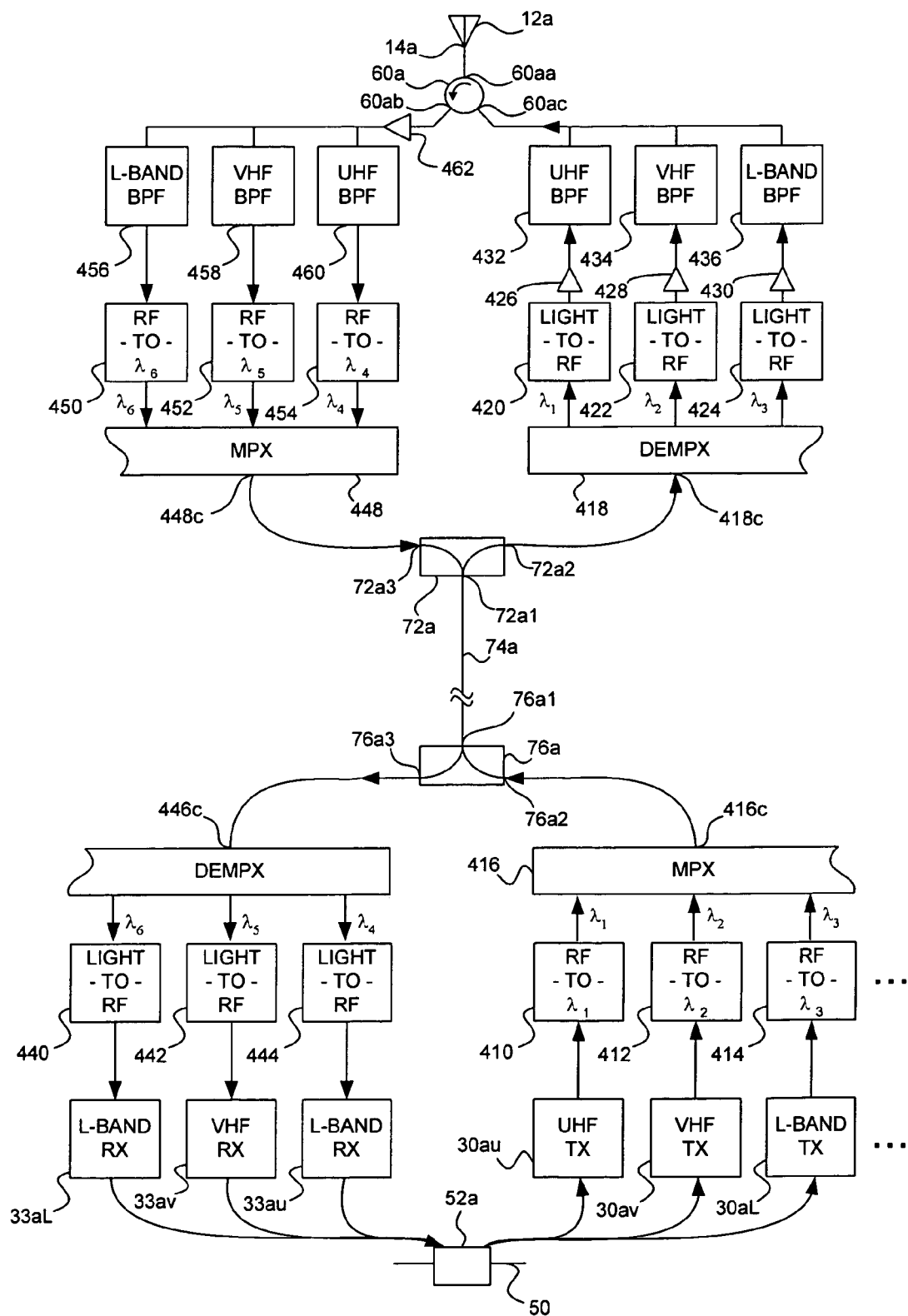
FIG. 4a is a simplified diagram in block and schematic form of an arrangement according to an aspect of the invention, which includes a plurality of transmitters and receivers, operating over a representative optical fiber communication path of FIG. 1.

FIG. 4a is a simplified diagram in block and schematic form of an arrangement according to an aspect of the invention, which includes a plurality of transmitters and receivers operating over a representative optical fiber communication path of FIG. 1, selected as being path 74a. In FIG. 4a, UHF transmitter (TX) 30au receives optical signals from node 52a of optical communication bus 50, and modulates the information directed to it onto an appropriate UHF carrier, which is applied to an RF-to-$\lambda_1$ converter 410. The resulting light at $\lambda_1$ is applied to a $\lambda_1$ input port of a multiplexer 416. VHF transmitter 30av receives optical signals from node 52a of optical communication bus 50, and modulates the information directed to it onto an appropriate VHF carrier, which is applied to an RF-to$\lambda_2$ converter 412. The resulting light at $\lambda_2$ is applied to a $\lambda_2$ input port of multiplexer 416. Similarly, L-band transmitter 30aL receives optical signals from node 52a of optical communication bus 50, and modulates the information directed to it onto an appropriate L-band carrier, which is applied to an RF-to-$\lambda_3$ converter 414. The resulting light at $\lambda_3$ is applied to a $\lambda_3$ input port of multiplexer 416. Multiplexer 416 combines the light at the various wavelengths $\lambda_1$, $\lambda_2$, and $\lambda_3$, representing signals to be transmitted, and couples the resulting multiplexed light signals to port 76a2 of coupler 76a. The light at wavelengths $\lambda_1$, $\lambda_2$, and $\lambda_3$ flows upward through optical fiber communication path 74a to port 72a1 of coupler 72a. Coupler 72a routes the signals flowing upward into port 72a1 to port 72a2, and modulated light at wavelengths $\lambda_1$, $\lambda_2$, and $\lambda_3$, representing signals to be transmitted, are applied to the common input port 418c of a demultiplexer 418. As mentioned above, there 1is no structural difference between a multiplexer and a demultiplexer, the difference lies solely in the use which is made of the structure. Demultiplexer 418 separates the light signals at wavelengths $\lambda_1$, $\lambda_2$, and $\lambda_3$ which are applied to its common input port into separate paths or channels, one for each individual wavelength (remembering that the modulation associated with each wavelength somewhat spreads the waveband). More particularly, the light at $\lambda_1$, is routed to the light input port of a light-to-RF converter 420, the light at $\lambda_2$ is routed to the light input port of a light-to-RF converter 422, and the light at $\lambda_3$ is routed to the light input port of a light-to-RF converter 424. Each of light-to-RF converters 420, 422, and 424 converts the signal associated with the light which it receives into the appropriate RF. The RF generated by light-to-RF converter 420 is at UHF, and is applied to the input port of a power amplifier 426, and the amplified UHF is applied through a UHF bandpass filter (BPF) to port 60ac of circulator 60a, which routes the UHF signal to antenna 12a. Similarly, the RF generated by light-to-RF converter 422 is at VHF, and is applied to the input port of a power amplifier 428, and the amplified VHF is applied through a VHF bandpass filter to port 60ac of circulator 60a, which routes the VHF signal to antenna 12a together with the UHF signal. The RF generated by light-to-RF converter 424 is at L-band, and is applied to the input port of a power amplifier 430, and the resulting amplified L-band signal is applied through an L-band bandpass filter to port 60ac of circulator 60a, which routes the L-band signal to antenna 12a, together with the UHF and VHF signals.

Antenna 12a of FIG. 4a may also receive UHF, VHF, and L-band signals, possibly at frequencies within the range which differ from those used for transmission. The received RF signals are coupled by port 60ab of circulator 60a to a low-noise amplifier 462, which amplifies the received signals. The amplified received signals are applied to an array of filters, for separating the received signals into separate paths or channels. More particularly, those received signals lying within L-band are coupled through L-band bandpass filter 456 to RF-to-$\lambda_6$ converter 450, those received signals lying within the VHF band are coupled through VHF-band bandpass filter 458 to RF-to-$\lambda_5$ converter 452, and those received signals lying within the UHF band are coupled through UHF bandpass filter 460 to RF-to-$\lambda_4$ converter 454.

Each of RF-to-light converters 450, 452, and 454 converts the electrical or RF signal received at its input port into light at $\lambda_6$, $\lambda_5$, and $\lambda_4$, respectively. The received signals in their forms of light at $\lambda_6$, $\lambda_5$, and $\lambda_4$ are applied to corresponding input ports of a multiplexer 448, and the combined or multiplexed light signals are coupled from common port 448c to input port 72a3 of coupler 72a, for routing the received signals "downward" through path 74a. The light signals at wavelengths $\lambda_6$, $\lambda_5$, and $\lambda_4$ arrive at port 76a1 of coupler 76a, which routes the signals to common input port 446c of demultiplexer 446. Demultiplexer 446 demultiplexes the light signals at wavelengths $\lambda_6$, $\lambda_5$, and $\lambda_4$, by coupling each individual wavelength to its own output port. Signals at wavelength $\lambda_6$ exit demultiplexer 446 and arrive at light-to-RF converter 440, which converts the light into L-band RF for application to L-band receiver 33aL. Signals at wavelength $\lambda_5$, exit demultiplexer 446 and arrive at light-to-RF converter 442, which converts the light into VHF signals, which are applied to VHF receiver 33av. Signals at wavelength $\lambda_4$, exit demultiplexer 446 and arrive at light-to-RF converter 444, which converts the light into UHF signals, which are applied to UHF receiver 33au. The receivers 33aL, 33av, and 33au perform their receiver functions to extract the information from the received signals, and the information is coupled to node 52a for distribution over the bus 50 to the various users.

Figure 4B:
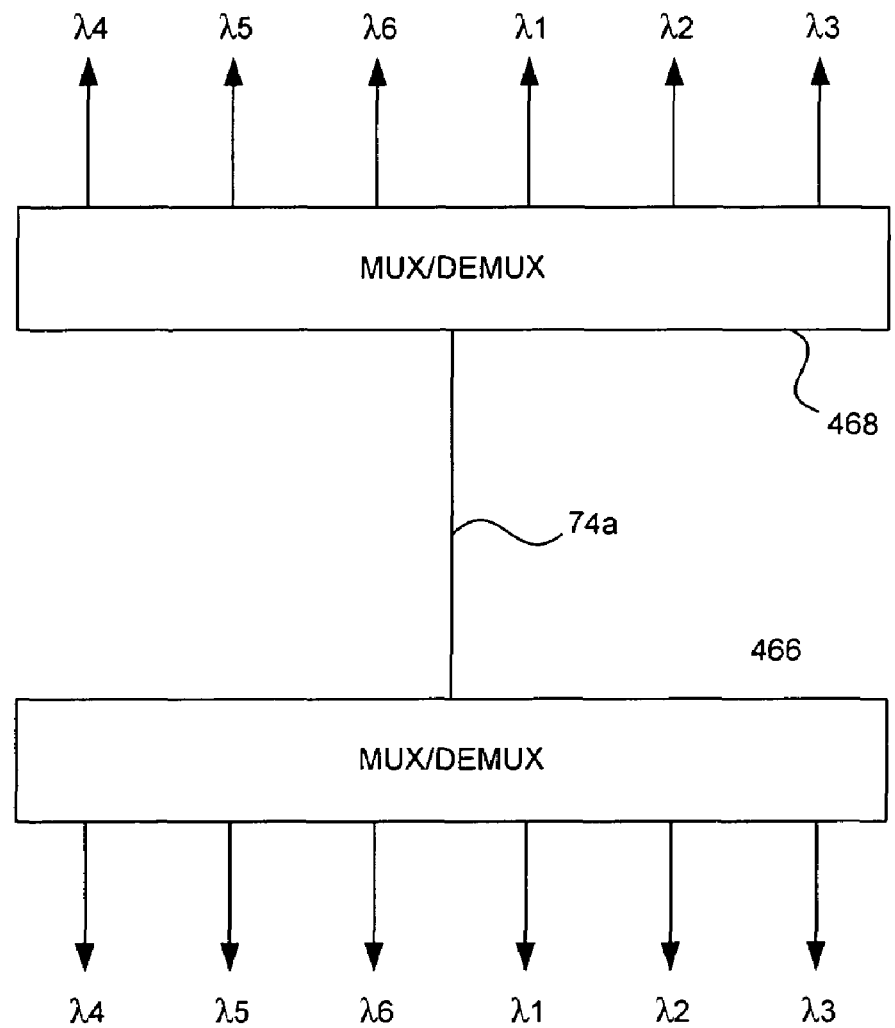

FIG. 4b illustrates an alternative to the arrangement of multiplexers 416 and 448, demultiplexers 418 and 446, first optical coupler 72a, and second optical coupler 76a, for allowing the flow of light at wavelengths $\lambda_1$, $\lambda_2$, $\lambda_3$, $\lambda_4$, $\lambda_5$, and $\lambda_6$ over optical f The arrangement of FIG. 4b eliminates the need for the optical couplers 72a and 76a.

Figure 5A:
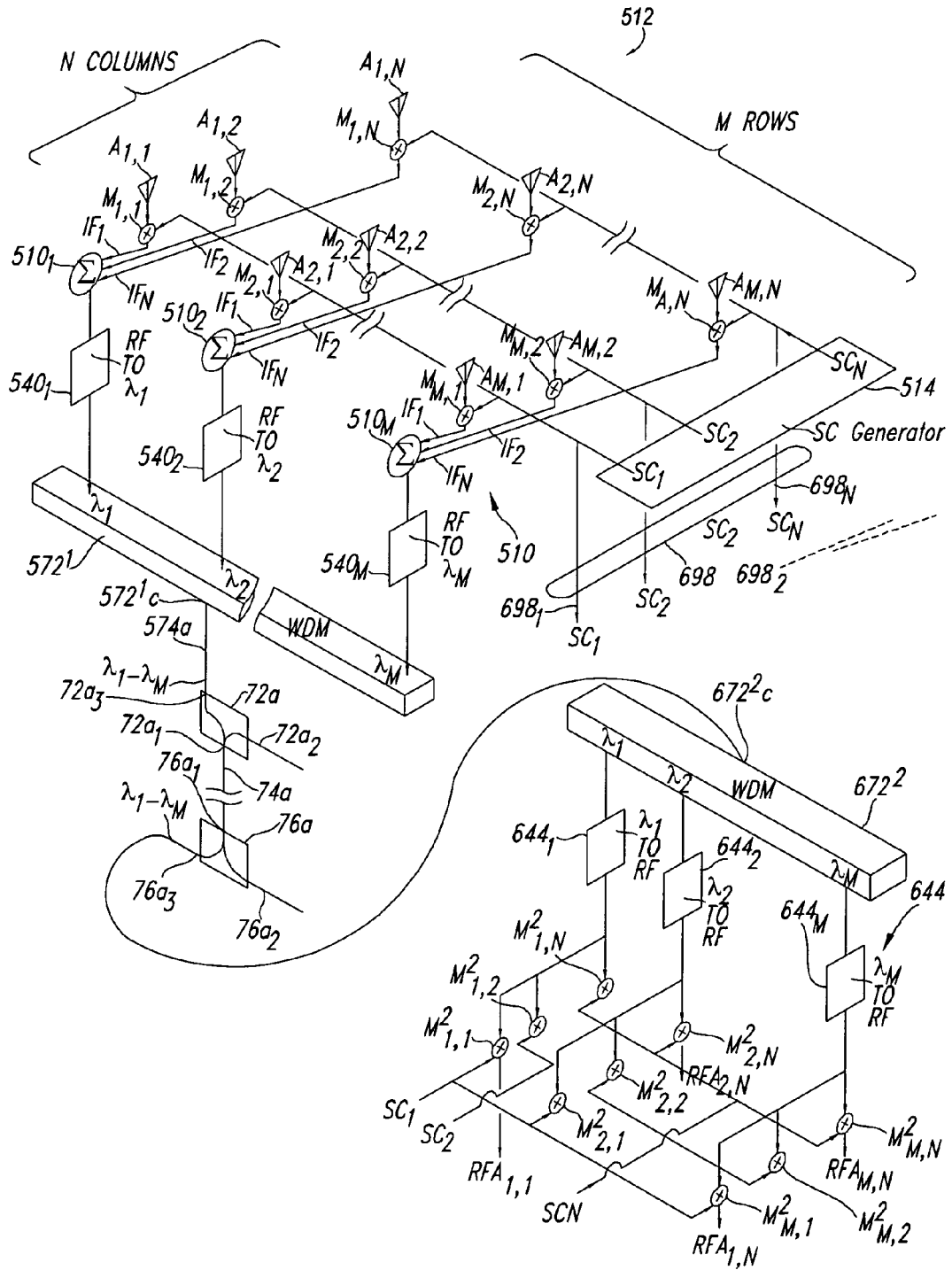
FIG. 5a is a simplified diagram in block and schematic form of a multiplexing arrangement according to an aspect of the invention, using multiple light wavelengths, and re-using each subcarrier on each wavelength.

FIG. 5a is a simplified diagram in block and schematic form, illustrating the receiver portion of an embodiment of the invention using an array antenna 512. In FIG. 5a, the array antenna 512 includes M rows and N columns of antenna elements, and each antenna element is identified by $A_{M,N}$. Thus, antenna element $A_{1,1}$, appears at the upper left corner of the array, and element $A_{M,N}$ is at the lower right. Each antenna element $A_{M,N}$ is coupled by way of a low-noise amplifier, illustrated as an open arrowhead, to an associated mixer or multiplier (X) designated $M_{M,N}$. Thus, the antenna element $A_{1,1}$ in the first row and first column is coupled by an amplifier "arrow" to a mixer designated $M_{1,1}$, which receives amplified signal at the frequency being received by its antenna element $A_{1,1}$. Similarly, antenna element $A_{1,2}$ in the first row, second column, is coupled by an amplifier "arrow" to a mixer designated $M_{1,2}$, which receives amplified signal at the frequency being received by antenna element $A_{1,2}$, . . . , and the last antenna element $A_{1,N}$ in the first row, $N^{th}$ column is coupled by an amplifier "arrow" to a mixer designated $M_{1,N}$, which receives amplified signal at the frequency being received by antenna element $A_{1,N}$. The antenna element $A_{2,1}$ in the second row, first column, is coupled by an amplifier "arrow" to a mixer designated $M_{2,1}$, which receives amplified signal at the frequency being received by its antenna element $A_{2,1}$. Similarly, antenna element $A_{2,2}$ in the second row, second column is coupled by an amplifier "arrow" to a mixer designated $M_{2,2}$, which receives amplified signal at the frequency being received by antenna element $A_{2,2}$, . . . , and the last antenna element $A_{2,N}$ in the second row, $N^{th}$ column, is coupled by an amplifier "arrow" to a mixer designated $M_{2,N}$, which receives amplified signal at the frequency being received by antenna element $A_{2,N}$. Antenna element $A_{M,1}$ in the $M^{th}$ row, first column, is coupled by an amplifier "arrow" to a mixer designated $M_{M,1}$, which receives amplified signal at the frequency being received by antenna element $A_{M,1}$. Similarly, antenna element $A_{M,2}$, in the $M^{th}$ row, second column, is coupled by an amplifier "arrow" to a mixer designated $M_{M,2}$, which receives amplified signal at the frequency being received by antenna element $A_{M,2}$, . . . , and the last antenna element $A_{M,N}$, in the $M^{th}$ row, last or $N^{th}$ column, is coupled by an amplifier "arrow" to a mixer designated $M_{M,N}$, which receives amplified signal at the frequency being received by antenna element $A_{M,N}$. Other rows and columns, not illustrated, have the same general structure as those described.

The array antenna is easiest to understand if it is assumed that only one electromagnetic signal is received by array antenna 512. In that case, each antenna element $A_{1,1}$ to $A_{M,N}$ receives signal at the same frequency as every other element, and each mixer also receives the signal of the same frequency, but with a phase which depends upon the location of the antenna element in the array. Each mixer $M_{M,N}$ also receives a subcarrier from a subcarrier generator 514 which is selected to, when mixed with the received signal, offset the resulting IF frequency from the received frequency. For this purpose, a subcarrier generator 514 in one example of the invention generates subcarriers at frequencies which are offset from each other by 10,000/MN MHz. The bandwidth of a single channel of light at 1550 nm has a total bandwidth of about 10,000 MHz, and there are M×N antenna elements in the arrangement of FIG. 5a, so this selection of subcarrier frequencies is capable, in the system as a whole, of providing one independent channel for each antenna element on a single wavelength light channel. Each subcarrier $SC_1$, $SC_2$, . . . , $SC_N$, produced by generator 514 is independently coupled to one of the mixers $M_{M,N}$. For simplicity, only a few of these connections are illustrated in FIG. 5a. Each of the multipliers multiples its received signal by the particular subcarrier, and produces a frequency-offset received signal at a frequency which is unique to that antenna element. All the received, frequency-offset signals associated with a particular row of the array are summed together in a summing ($\Sigma$) circuit of a set 510 of summing circuits. More particularly, the frequency-offset signals $IF_1$, $IF_2$, . . . , $IF_N$ produced by multipliers $M_{1,1}$, $M_{1,2}$, . . . , $M_{1,N}$, respectively, are coupled to a summing circuit $510_1$. The output of the summing circuit $510_1$, is N signals, each on a frequency offset from the next. Similarly, frequency-offset signals $IF_1$, $IF_2$, . . . , $IF_N$ produced by multipliers $M_{2,1}$, $M_{2,2}$, . . . , $M_{2,N}$, respectively, are coupled to a summing circuit $510_2$. The output of the summing circuit $510_2$ is N signals, each on a frequency offset from the next. It should be noted that the frequencies (the IF signals $IF_1$, $IF_2$, . . . , $IF_2$) summed in summing circuit $510_2$ are the same as the frequencies summed in summing circuit $510_2$, because the same subcarrier frequency is applied to all of the multipliers in a column, and each antenna element $A_{M,N}$ receives the same electromagnetic signal (although with different phases, as mentioned). For completeness, frequency-offset signals $IF_1$, $IF_2$, . . . , $IF_N$ produced by multipliers $M_{M,1}$, $M_{M,2}$, . . . , $M_{M,N}$, . . . , respectively, are coupled to a summing circuit $510_M$. The output of the summing circuit $510_M$ is N mutually-frequency-offset signals.

The IF carriers IF1, IF2, . . . , IFN from summing circuit $510_1$, of FIG. 5a are applied to an RF-to-$\lambda_1$ converter $540_1$, the IF carriers IF1, IF2, . . . , IFN from summing circuit $510_2$ are applied to an RF-to-$\lambda_2$ converter $540_2$, . . . , and the IF carriers IF1, IF2, . . . , IFN from summing circuit $510_M$ are applied to an RF-to-$\lambda_M$ converter $540_M$. The various wavelengths of RF-modulated light at $\lambda_1$, $\lambda_2$, . . . , $\lambda_M$, are applied over separate paths to corresponding input ports of a wavelength-division multiplexer (WDM) $572^1$. Wavelength-division multiplexer $572^1$ combines all of the RF-modulated light at wavelengths $\lambda_1, \lambda_2, \ldots \lambda_M$, and couples them from its combined output port $572^1c$ to port $72a3$ of coupler $72a$. Coupler $72a$ acts in a directional manner, and couples the RF-modulated light at wavelengths $\lambda_1, \lambda_2, \ldots \lambda_M$, representing the signals received by the elements of array antenna 512, by way of its common port $72a1$ onto optical fiber communication path 74a. The RF-modulated light at wavelengths $\lambda_1, \lambda_2, \ldots \lambda_M$ travels "downward" in optical fiber communication path 74a to port 76a1 of optical directional coupler 76a, which directs the light representing received signals by way of its output port 76a3 to common port $672^2c$ of a wavelength division multiplexer $672^2$, operating as a demultiplexer. Wavelength-division multiplexer $672^2$, operating as a demultiplexer, separates the various RF-modulated wavelengths of light $\lambda_1, \lambda_2, \ldots \lambda_M$ applied to its input port $672^2c$ into individual wavelengths at individual output ports. More particularly, WDM $672^2$ couples $\lambda_1, \lambda_2, \ldots \lambda_M$ applied to its input port $672^2c$ to correspondingly designated output ports, and from those output ports to a set 644 of light-to-RF converters $644_1, 644_2, \ldots, 644_M$ which reconstitute the RF modulation in the form of the RF-modulated subcarriers $SC_1, SC_2, \ldots, SC_M$. In order to separate the modulated subcarriers from each other, the output from each RF-to-light converter of set 644 is applied to a set of mixers, corresponding to the set by which they were modulated. More particularly, the set of RF-modulated subcarriers generated at the output of light-to-RF converter $644_1$ of FIG. 5a is applied to a set $M^2$ of mixers $M^2_{1,1}, M^2_{1,2}, \ldots, M^2_{1,N}$, the set of RF-modulated subcarriers generated at the output of light-to-RF converter $644_2$ of FIG. 5a is applied to a set of mixers $M^2_{2,1}, M^2_{2,2}, \ldots, M^2_{2,N}$, and the set of RF-modulated subcarriers generated at the output of light-to-RF converter $644_M$, of FIG. 5a is applied to a set of mixers $M^2_{M,1}, M^2_{M,2}, \ldots, M^2_{M,N}$. Each mixer of set $M^2$ of mixers also receives, by way of a signal path 698a, 698b, . . . , 698N, of a set 698 of signal paths, one of the subcarriers SC1, SC2, . . . , or SCN, respectively, to thereby convert its RF-modulated subcarrier back to the original RF received at the corresponding antenna element. More particularly, mixers $M^2_{1,1}, M^2_{2,1}, \ldots, M^2_{M,1}$ receive subcarrier SC1, mixers $M^2_{1,2}, M^2_{2,2}, \ldots, M^2_{M,2}$ receive subcarrier SC2, . . . , and mixers $M^2_{1,N}, M^2_{2,N}, \ldots, M^2_{M,N}$ receive subcarrier SCN. The combination of RF-modulated subcarrier and subcarrier received by each mixer of set $M^2$ reconstitutes the RF modulation produced by one of antennas of array antenna 612, for further processing.

Figure 5B:
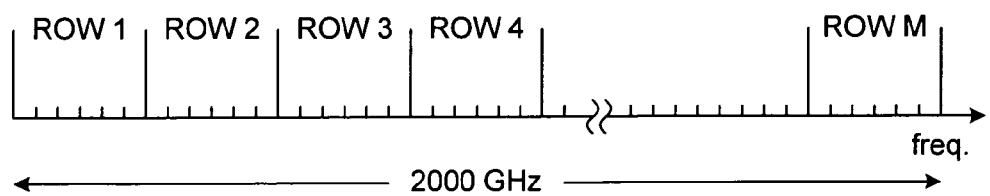
FIG. 5b is a representation of assignment of blocks or portions of a frequency spectrum to the various rows of the array antenna of FIG. 5a, and FIG. 5c is a frequency spectrum illustrating the assignment of subcarriers within one of the blocks of the spectrum of FIG. 5b.
Figure 5C:
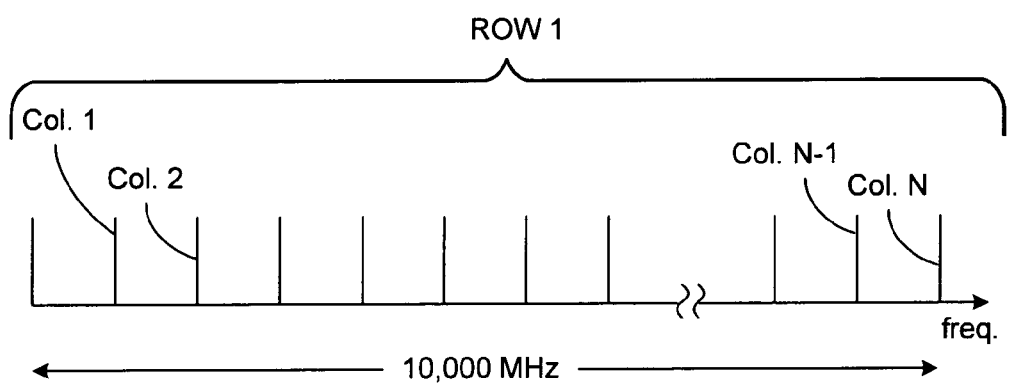

FIG. 5b illustrates one possible distribution of the subcarriers within the bandwidth of the available channel. In FIG. 5b, the available bandwidth of the optical fiber or light channel (taken as being 2000 GHz) is divided into a number of portions which equals M, the number of rows of antenna elements in antenna array 512 of FIG. 5a. Thus, the first or left-most frequency band, at the longest wavelength, is assigned to row 1, the second band, having the same bandwidth as the first band, is assigned to row 2, and so forth, until the last band in FIG. 5b, also having the same bandwidth, is assigned to row M. FIG. 5c is an expanded illustration of the first of the bands of FIG. 5b, namely the band assigned to row 1. Within the band assigned to row 1, the lowest frequency (longest wavelength) subcarrier is assigned to column (Col) 1, the next adjacent frequency is assigned to column 2, and so forth, until the highest frequency (shortest wavelength) subcarrier within the band assigned to row 1 is assigned to column N.

Processing of the RF signals to define the receive beam associated with array antenna 512 of FIG. 5a is performed in a well-known manner, namely that of multiplication of each carrier having a particular phase by a cosine waveform, to thereby generate an intermediate frequency (IF) signal of the same phase as that of the original carrier.

Other embodiments of the invention will be apparent to those skilled in the art. For example, a hybrid power splitter/combiner may be used in order to separate transmitted signals from received signals instead of a circulator such as circulator 60a. While the optical communication system 50 of FIG. 1 should transmit signals with each message which identify the equipment which is to act on the message, this identification can be implicit, rather than explicit; if, for example, the transmitters 32a and 32b are capable of operation in the frequency range of 100–110 MHz and 111–120 MHz, respectively, a command which identifies transmission at 115 MHz implicitly addresses transmitter 32b rather than 32a, and rather than receivers 34a, 34b. While some of the embodiments have been described as operating with signals in the UHF, VHF, and L-band ranges, signals at different frequencies within the same range can be used, or any other range or ranges, such as LF, may be used, and any combination of frequencies within ranges and other ranges may also be used.

Thus, a communication system (10) according to the invention includes a set (12) of electromagnetic/electrical transducers (12a, 12b, . . .). This set (12) may contain as few as one electromagnetic/electrical transducer. Each of the transducers is for transducing signals between free space (8) and at least one associated electrical port (14a, 14b, . . . ). The communication system includes a plurality of sources (16a, 16b, 18a, 18b, 20a) and sinks (22a, 22b, 23a, 23b) of optical communications signals. The optical communications signals may be analog or digital, and may include control signals (from 20a). These control signals include signals for controlling the transmitters and receivers, as by selecting frequency, bandwidth, and/or power. The communications signals and the control signals are generated or received at optical ports (18a1, 18b1, 20a1, 23a1, 23b1). The communication system (10) also includes a set (30) including a set (30a, 30b) of transmitters (32a, 36a, 32b, 36b) and a set (33a, 33b) of receivers (34a, 38a, 34b, 38b), which set (30) may include only one of a transmitter (32a, 36a) and a receiver (34b, 38b), which is to say only a single transmitter, a single receiver, or both a single transmitter and a single receiver. Each one of the transmitters (32a, 36a; 32b, 36b) and receivers (34a, 38a, 34b, 38b) of the set (30) of transmitters (32a, 36a; 32b, 36a) and receivers (34a, 38a, 34b, 38b) includes a first electrical port (32ae, 32be, 34ae, 34be) and a light port (36a1, 36b1, 38a1, 38b1). Each one of the transmitters (32a, 36a; 32b, 36b) converts light signals applied to the light port (36a1, 36b1) into electrical signals at the first electrical port (32ae, 32be). The conversion of light signals into electrical signals may be accompanied by frequency conversion under the control of the control signals. Depending upon the types of signals, each of the transmitters may accept digital light signals, and produce analog electrical signals. Each one of the receivers (34a, 38a1; 34b, 38b1) converts electrical signal applied to its electrical port (34ae, 34be) into light signals at its light port (38a1, 38b1), with frequency conversion, if appropriate, under the control of the control signals, and with analog-to-digital conversion if appropriate. The communication system (10) also includes an optical communication bus (50) coupled to the light signal ports (18a1, 18b1, 20a1, 23a1, 23b1) of the sources (16a, 16b, 18a, 18b, 20a) and sinks (22a, 22b, 23a, 23b) of optical communications signals, and of the light ports (36a1, 36b1, 38a1, 38b1) of the transmitters (32a, 32b, 36a, 36b) and receivers (34a, 34b, 38a, 38b), for coupling the communications and associated control signals among the sources (16a, 16b, 18a, 18b, 20a), sinks (22a, 22b, 23a, 23b), transmitters (32a, 32b, 36a, 36b) (34a, 34b, 38a, 38b). As a result of these connections, light signals can be communicated at least from the sources (16a, 16b, 18a, 18b, 20a) to the transmitters (32a, 32b, 36a, 36b) receivers (34a, 34b, 38a, 38b) and from the receivers (34a, 34b, 38a, 38b) to the sinks (22a, 22b, 23a, 23b). A plurality of electrical-to-light converters (40a, 40b, 46a, 46b) are included in the communication system (10). Each of the electrical-to-light converters (40a, 40b, 46a, 46b) includes an electrical port (40ae, 40be, 46ae, 46be) and a light port (40a1, 40b1, 46a1, 46b1), and converts electrical signals applied to the electrical port (40ae, 40be, 46ae, 46be) into light signals at the light port (40a1, 40b1, 46a1, 46b1). Some of the electrical-to-light converters (40a, 40b) have their electrical ports (40ae, 40be) coupled (by way of circulators 60a, 60b) to the electromagnetic/electrical transducers (12a, 12b, . . . ). Others of the electrical-to-light converters (46a, 46b) have their electrical ports (40ae, 40be) coupled to the first electrical ports (32ae, 32be) of the transmitters (32a, 36a, 32b, 36b). The communication system (10) further includes a plurality of light-to-electrical converters (42a, 42b, 44a, 44b). Each of the light-to-electrical converters (42a, 42b, 44a, 44b) includes a light port (42a1, 42b1, 44a1, 44b1) and an electrical port (42ae, 42be, 44ae, 44be), for converting light signals applied to the light port (42a1, 42b1, 44a1, 44b1) into electrical signals at the electrical port (42ae, 42be, 44ae, 44be). Some of the light-to-electrical converters (42a, 42b) have their electrical ports (42ae, 42be) coupled (by way of circulators 60a, 60b) to the electromagnetic/electrical transducers (12a, 12b . . . ). Others of the light-to-electrical converters (44a, 44b) have their electrical ports (44ae, 44be) coupled to the electrical ports (34ae, 34be) of the receivers (34a, 38a, 34b, 38b). The communication system includes a bidirectional optical communication link (70a, 70b) extending between the light ports (40a1, 40b1, 46a1, 46b1) of the electrical-to-light converters (40a, 40b, 46a, 46b) and the light ports (42a1, 42b1, 44a1, 44b1) of the light-to-electrical converters (42a, 42b, 44a, 44b).

In a particular embodiment of the invention, each of the electromagnetic/electrical transducers (12a, 12b, . . . ) comprises an antenna. In another version, each of the transmitters (32a, 36a, 32b, 36b) includes a further electrical port (32a2, 32b2), and an electrical transmitter portion (32a, 32b) extending between the first electrical port (32ae, 32be) and the further electrical port (32a2, 32b2); in this other version, a light-to-electrical signal converter (36a, 36b) is coupled between the light port (36a1, 36b1) of the transmitter and the further electrical port (32a2, 32b2), for transducing light arriving from the bus (50) into electrical signals for the electrical transmitter portion (32a, 32b).

In a further manifestation of the invention, a communication system (10) further comprises an amplifier (64a, 64b) coupled to the electrical port (42ae, 42be) of the light-to-electrical converter (42a, 42b), for amplifying electrical signals flowing toward the electromagnetic/electrical transducers (12a, 12b, . . . ). In another avatar, the communication system (10) further includes a circulator coupled to the electromagnetic/electrical transducers (12a, 12b, . . . ), and to the electrical ports (40ae, 40be, 42ae, 42be) of some of the electrical-to-light converters (40a, 40b) and light-to-electrical converters (42a, 42b). The purpose of the circulator is to separate the received signals from the transmitted signals.

If the frequency conversion provided by the transmitters and receivers is such that the frequencies of the transmitted and received electrical signals are different, a frequency-division filter may be used instead of a circulator.

What is claimed is:

1. A communication system comprising:
    a set of electromagnetic/electrical transducers, which set may contain as few as one electromagnetic/electrical transducer, for transducing signals between free space and at least one electrical port associated with each said electromagnetic/electrical transducer:
    a plurality of sources and sinks of optical communications signals, which communications signals may include control signals, said sources and sinks of optical communications signals including light signal ports;
    a set of light-in, electrical-out transmitters and electrical-in, light-out receivers, which set may include only one of a light-in, electrical-out transmitter and an electrical-in, light-out receiver, each one of said light-in, electrical-out transmitters and electrical-in, light-out receivers of said set of light-in, electrical-out transmitters and electrical-in, light-out receivers including a first electrical port and a light port each one of said light-in, electrical-out transmitters converting light signals applied to said light port into electrical signals at said first electrical port and each one of said electrical-in, light-out receivers converting electrical signal applied to said electrical port into light signals at said light port;
    an optical communication bus coupled to said light signal ports of said sources and sinks of optical communications signals, and of said light ports of said light-in, electrical-out transmitters and electrical-in, light-out receivers, for coupling said communications signals, and associated control signals, among said sources, sinks, light-in, electrical-out transmitters and electrical-in, light-out receivers, whereby light signals can be communicated at least from said sources to said light-in, electrical-out transmitters and electrical-in, light-out receivers and from said electrical-in, light-out receivers to said sinks;
    a plurality of electrical-to-light converters, each of said electrical-to-light converters including an electrical port and a light port, for converting electrical signals applied to said electrical port into light signals at said light port, some of said electrical-to-light converters having their electrical ports coupled to said electromagnetic/electrical transducers, and others of said electrical-to-light converters having their electrical ports coupled to said first electrical ports of said light-in, electrical-out transmitters;
    a plurality of light-to-electrical converters, each of said light-to-electrical converters including a light port and an electrical port, for converting light signals applied to said light port into electrical signals at said electrical port, some of said light-to-electrical converters having their electrical ports coupled to said electromagnetic/ electrical transducers, and others of said light-to-electrical converters having their electrical ports coupled to said electrical ports of said electrical-in, light-out receivers; and
    a bidirectional optical communication link extending between said light ports of said electrical-to-light converters and said light ports of said light-to-electrical converters wherein each of said light-in, electrical-out transmitters performs frequency conversion under the control of said control signals.

2. A communication system, according to claim 1, wherein each of said electrical-in, light-out receivers performs frequency conversion under the control of said control signals.

3. A communication system, according to claim 1, wherein each of said electromagnetic/electrical transducers comprises an antenna.

4. A communication system, according to claim 1, wherein each of said light-in, electrical-out transmitters includes:
  a further electrical port;
  an electrical-in, electrical-out transmitter portion extending between said first electrical port and said further electrical port; and
  a light-to-electrical signal converter coupled between said light port of said light-in, electrical-out transmitter and said further electrical port, for transducing light arriving from said bus into electrical signals for said electrical-in, electrical-out transmitter portion.

5. A communication system, according to claim 1, wherein each of said electrical-in, light-out receivers includes:
  a further electrical port;
  an electrical-in, electrical-out receiver portion extending between said first electrical port of said receivers and said further electrical port; and
  an electrical-to-light signal converter coupled between said light port of said electrical-in, light-out receiver and said further electrical port, for transducing electrical signals from said further electrical port of said electrical-in, light-out receiver into light signals to said bus.

6. A communication system, according to claim 1, further comprising an amplifier coupled to said electrical port of said light-to-electrical converter, for amplifying electrical signals flowing toward said electromagnetic/electrical transducers.

7. A communication system, according to claim 1, further comprising a circulator coupled to said electromagnetic/electrical transducers, and to said electrical ports of some of said electrical-to-light converters and light-to-electrical converters.

* * * * *